United States Patent
Lakes et al.

(10) Patent No.: US 11,163,847 B2
(45) Date of Patent: *Nov. 2, 2021

(54) REDIRECTION SERVICE PROFILING

(71) Applicants: Jesse Lakes, Bethesda, MD (US); Jesse Pasichnyk, Seattle, WA (US)

(72) Inventors: Jesse Lakes, Bethesda, MD (US); Jesse Pasichnyk, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/596,173

(22) Filed: Oct. 8, 2019

(65) Prior Publication Data
US 2020/0226184 A1 Jul. 16, 2020

Related U.S. Application Data

(63) Continuation of application No. 14/493,055, filed on Sep. 22, 2014, now Pat. No. 10,437,903.

(60) Provisional application No. 61/880,733, filed on Sep. 20, 2013.

(51) Int. Cl.
  *G06F 15/16* (2006.01)
  *G06F 16/955* (2019.01)
  *H04L 29/08* (2006.01)

(52) U.S. Cl.
  CPC ............ *G06F 16/955* (2019.01); *H04L 67/02* (2013.01); *H04L 67/303* (2013.01)

(58) Field of Classification Search
  CPC .. G06F 16/955; G06F 16/9566; G06F 16/958; H04L 67/02; H04L 29/06; H04L 67/303; H04L 67/20
  See application file for complete search history.

(56) References Cited

U.S. PATENT DOCUMENTS

| | | | | |
|---|---|---|---|---|
| 5,751,956 A | * | 5/1998 | Kirsch | H04L 12/1471 709/203 |
| 6,131,095 A | * | 10/2000 | Low | H04L 29/12066 |
| 7,136,932 B1 | * | 11/2006 | Schneider | H04L 29/12594 709/245 |
| 8,683,496 B2 | * | 3/2014 | Reeves | G09G 5/14 719/319 |
| 9,356,821 B1 | * | 5/2016 | Jagannathan | H04L 69/24 |
| 2003/0220837 A1 | * | 11/2003 | Asayama | G06Q 30/0214 705/14.16 |
| 2003/0220867 A1 | * | 11/2003 | Goodwin | G06Q 40/04 705/37 |
| 2004/0078334 A1 | * | 4/2004 | Malcolm | G06F 21/6218 705/50 |
| 2005/0273388 A1 | * | 12/2005 | Roetter | G06Q 30/0242 705/14.4 |
| 2007/0100967 A1 | * | 5/2007 | Smith | G06F 8/20 709/219 |
| 2012/0054327 A1 | * | 3/2012 | Clinton | G06F 16/955 709/223 |
| 2012/0166267 A1 | * | 6/2012 | Beatty | G06Q 30/0219 705/14.21 |

(Continued)

*Primary Examiner* — Lizbeth Torres-Diaz
(74) *Attorney, Agent, or Firm* — Brian J. Pangrle

(57) ABSTRACT

A system can include a processor; memory operatively coupled to the processor; an input; an output; and one or more modules stored in the memory that include instructions executable by the processor to instruct the system to receive information, via the input, that includes information associated with a target; parse the information; access a profile; and build a link based at least in part on the information and at least in part on the profile.

18 Claims, 20 Drawing Sheets

(56) References Cited

U.S. PATENT DOCUMENTS

| | | | |
|---|---|---|---|
| 2013/0080268 A1* | 3/2013 | Gordon | G06F 16/41 |
| | | | 705/14.73 |
| 2013/0263160 A1* | 10/2013 | Sandholm | G06F 9/541 |
| | | | 719/328 |
| 2014/0019248 A1* | 1/2014 | Stoliartchouk | G06Q 30/0261 |
| | | | 705/14.58 |
| 2016/0241625 A1* | 8/2016 | Jagannathan | H04L 65/4084 |
| 2020/0226184 A1* | 7/2020 | Lakes | H04L 67/303 |

* cited by examiner

| Decay 430 | | | | |
|---|---|---|---|---|
| | Exact Match 432 | ◆ Metadata 407-A (Item ID 403-2) | = | △ Item ID 403-1 |
| | Perfect Match 434 | ◆ Metadata 407-A | = | △ Item ID 403-1 |
| | Best Match 436 | ◆ Metadata 407-A | ~ | △ Item ID 403-1 |
| | Album/Artist 440 | ◆ Metadata 407-A | → | ▨ |
| | Search 450 | ◆ Metadata 407-A | | |
| | Genre 452 | △ Item ID-1, 2, . . . N 403-1 | | |
| | Media Type 454 | △ Item ID-1, 2, . . . N 403-1 | | |
| | Other 456 | △ Item ID-1, 2, . . . N 403-1 | | |
| | Media Format 460 | ◆ Metadata 407-A | → | ▨ |
| | Store Front 470 | △ 403-1 | | |
| Other 480 | Defined Exit 482 | If X ≠ Y then Z | | |

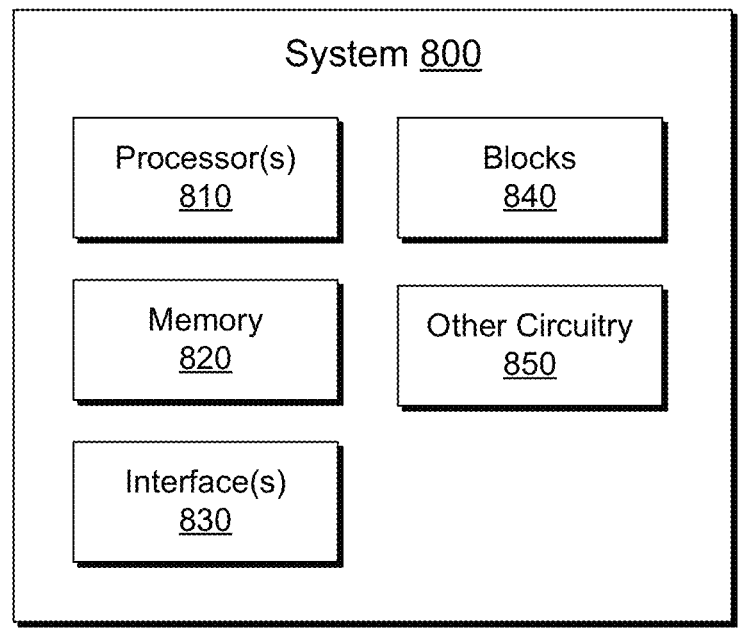
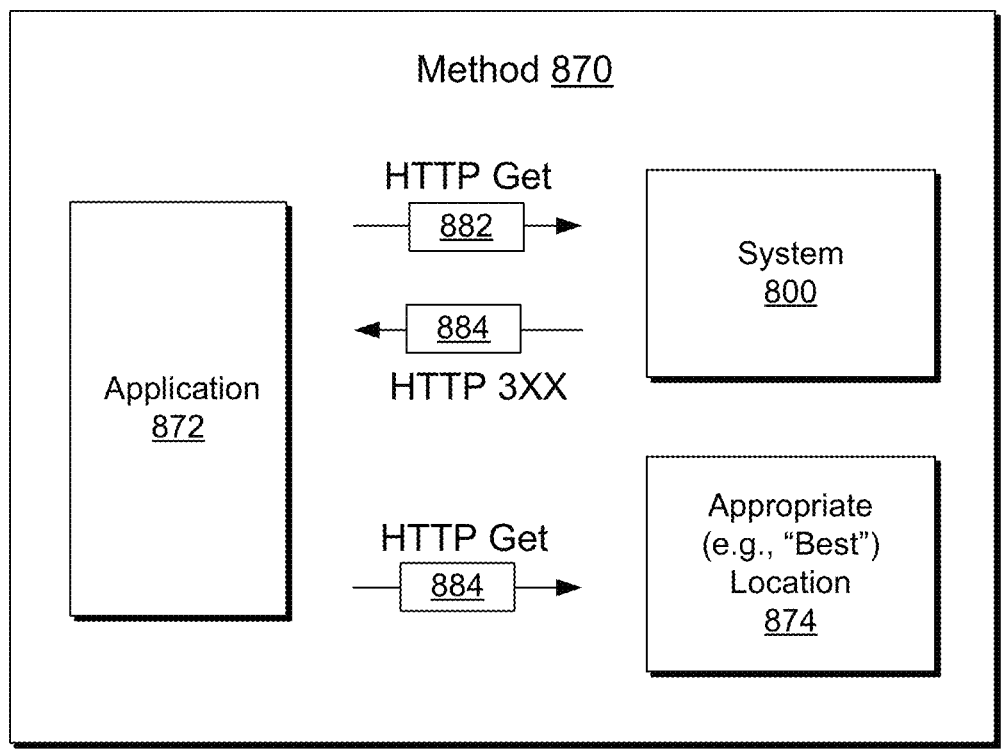
Fig. 8

Example Scheme 910

Create data-based individual "profiles" (e.g., clicks, purchases, other)
Utilize "profiles":
    Aggregate clicks by a common identifier
    Create conversion funnel for clicks to purchases
    Match iTunes / App Store sales to profiles
    Derive preferences based on financial actions Example Implementations 920

Preferences towards genres
Best monetized via CPI, CPC, or CPM
Categorize based on actual spend
Freemium candidate (e.g., Pays for In-App Purchases, or not)
Don't serve irrelevant ads (e.g., history click/ownership)
Likelihood to convert
Affinity towards other media types Example Service Criteria 930

Wide range of traffic via entity base
    ad networks, developers, labels, studios, etc.
Visibility of click to sale cycle,
    across multiple media types, and
    across multiple ecosystems.
Cross network / app / device Example Information 940

General
Unique Identifier
  IDFA
  Cookie
Location
  Country
  Postal Code
Language
Device Type
OS Version User Value
% sessions converting
% links converting
% in-app purchases (#)
% in-app purchases ($$$)
Lifetime Purchase Value
By Media Type Profile Depth Score
Last Updated
# of queries
# of clicks
# of purchases User Profile
Opened / Installed Apps
Adam ID
Genre Summary
Used Apps
Adam ID
Genre Summary Clicks Profile
App Links Clicked
  Adam ID
    Conversion
  Genre
    Conversion
Time of Day
  Queries
  Clicks

Fig. 9

Example Information 1200

| Category | Information | Source |
| --- | --- | --- |
| "Link" data | What app the URL is for. Get genre, developer, price, etc. of the app. | The Link that is clicked on and gets processed through service. |
| "Header" data | IP address, cookie, user agent, referrer, time stamp, etc. See, e.g.,: http://en.wikipedia.org/wiki/HTTP_header | A user's device clicking on the link. Information for operation of Internet. |
| "Commission" data | Category of product purchased during affiliate window, price point(s), quantity, "campaign ID" or "tracking tag", timestamp, etc. | Examples, via Apple, via the affiliate networks, etc. |
| "Client Provided" data | IDFA (ID For Advertising) (e.g., unique identifier per iOS device) or other advertising identifier. As an example, a list of apps that are currently open. | The client (ad network) pass info either, for example, via an API, passed along as parameters when a link is clicked, etc. |

Fig. 12

> https://itunes.apple.com/us/app/angry-birds-space/id509193195?mt=12

Category: Games
Updated: Jul 23, 2014
Version: 2.0.1
Size: 58.5 MB
Language: English
Seller: Rovio Entertainment Ltd
© Rovio Entertainment Ltd
Rated 4+
Compatibility: OS X 10.6 or later > https://www.amazon.com/Rovio-Entertainment-Ltd-Angry-Birds/dp/B007N5YIUS/ref=sr_

Size: 43.5MB
Version: 2.0.1
Developed By: Rovio Entertainment Ltd. (Privacy Policy Click to see complete result in a new window)
Application Permissions: (Help me understand what permissions mean)
    Read only access to device state
    Open network sockets
    Write to external storage
    com.google.android.c2dm.permission.REGISTRATION
    Access information about Wi-Fi networks
    Access the list of accounts in the Accounts Service
    Access information about networks
    PowerManager WakeLocks to keep processor from sleeping or screen from dimming
    Allows an application to receive messages via Google Cloud Messaging
Minimum Operating System: Android 2.3
Approximate Download Time: More than 5 minutes > https://itunes.apple.com/us/app/angry-birds-space/id499511971?mt=8

Category: Games
Updated: Jul 10, 2014
Version: 2.0.1
Size: 42.1 MB
Language: English
Seller: Rovio Entertainment Ltd
© Rovio Entertainment Ltd
Rated 4+
Compatibility: Requires iOS 4.3 or later.
Compatible with iPhone, iPad, and iPod touch.
This app is optimized for iPhone 5.

Fig. 17

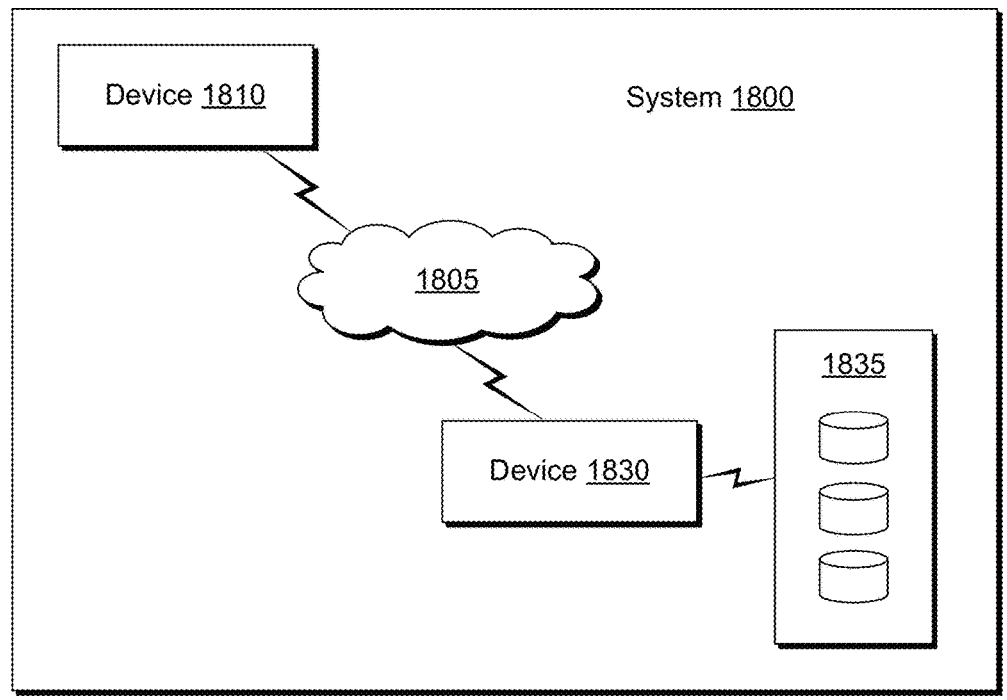
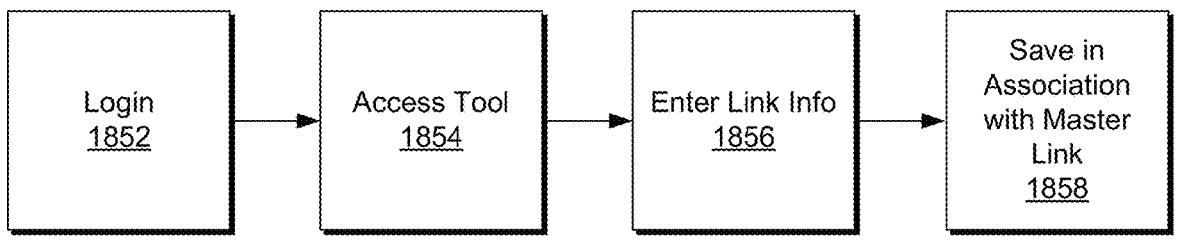
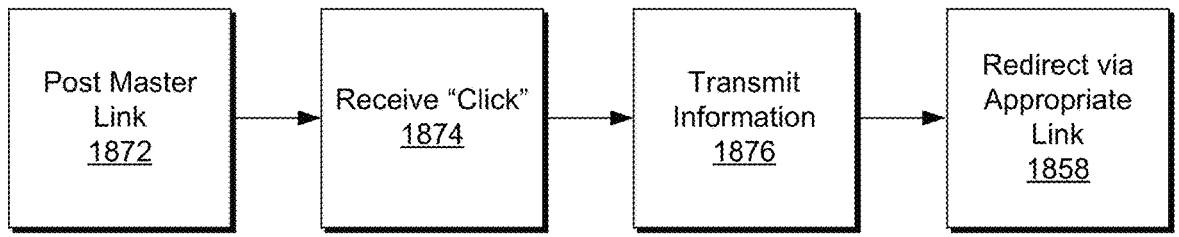
Fig. 18

```
▼ object {1}
    ▼ Rules {1}
        ▼ 0 {2}
            AdvertiserName : amazon
            ▼ Rules {21}
                ▶ 0 {3}
                ▶ 1 {3}
                ▶ 2 {3}
                ▼ 3 {3}
                    DefiningAttribute : Source.ProductGroup
                    Value : $ProductGroup$DigitalMusicAlbum
                    ▼ RuleSets {5}
                        ▼ 0 {4}
                            __type : Georiot.MatchingEngine.RuleSet, Georiot.MatchingEngine
                            Name : ExactMatch
                            Order : 1
                            ▼ Operations {1}
                                ▼ 0 {8}
                                    __type : Georiot.MatchingEngine.ComparisonOperation, Georiot.MatchingEngine
                                    Order : 1
                                    Type : Operation
                                    Operation : Equals
                                    Input : Link.Asin
                                    Parameter : target.Asin
                                    OnFail : Fail
                                    OnSuccess : Pass
                        ▼ 1 {4}
                            __type : Georiot.MatchingEngine.RuleSet, Georiot.MatchingEngine
                            Name : PerfectMatch
                            Order : 2
                            ▼ Operations {4}
                                ▶ 0 {8}
                                ▶ 1 {8}
                                ▶ 2 {8}
                                ▶ 3 {4}
                        ▼ 2 {4}
                            __type : Georiot.MatchingEngine.RuleSet, Georiot.MatchingEngine
                            Name : BestMatch
                            Order : 3
                            ▶ Operations {7}
                        ▶ 3 {4}
                        ▶ 4 {4}
                ▶ 4 {3}
```

Fig. 20

REDIRECTION SERVICE PROFILING

RELATED APPLICATIONS

This application is a continuation of a co-pending U.S. patent application Ser. No. 14/493,055, filed 22 Sep. 2014 (issued as U.S. Pat. No. 10,437,903 on 8 Oct. 2019), which is incorporated by reference herein, and which claims the benefit of and priority to a U.S. Provisional Application having Ser. No. 61/880,733, filed 20 Sep. 2013, which is incorporated by reference herein.

TECHNICAL FIELD

Subject matter disclosed herein generally relates to technologies and techniques for redirecting services.

BACKGROUND

Internet services include redirection services that may be provided by, for example, the HTTP protocol, which finds use with the Internet and the World Wide Web (e.g., interlinked hypertext documents accessible via the Internet). The Internet is a global system of interconnected networks that link computers, mobile devices, computing equipment, storage, etc. The Internet is often referred to as "a network of networks".

For the Internet, resources (e.g., information, programs, etc.) are located using uniform resource locators or universal resource locator (URLs), a type of uniform resource identifier (URI). A URL includes, for example: a scheme name (e.g., HTTP), followed by a colon, two slashes, then, depending on scheme, a domain name (e.g., alternatively, an IP address), a port number, a path of a resource to be fetched or a program to be run, then, for example, for programs such as Common Gateway Interface (CGI) scripts, a query string, key-value string, etc., and an optional fragment identifier.

Communication over the Internet can occur via a standard Internet protocol suite such as the Transmission Control Protocol (TCP) and Internet Protocol (IP) suite. The TCP/IP Internet protocol suite classifies its methods and protocols into four hierarchical abstraction layers: the link layer, the Internet layer, the transport layer, and the application layer. Each layer has functionality that solves a set of problems within its particular scope.

HTTP is an application layer protocol within the TCP/IP suite. The protocol definitions presume a reliable transport layer protocol for host-to-host data transfer (e.g., TCP). HTTP has found application with other protocols, such as the User Datagram Protocol (UDP), for example, in methods such as the Simple Service Discovery Protocol (SSDP).

As to redirecting, using HTTP as an example, a redirect is a response with a status code beginning with 3 that induces a browser to go to another location, with annotation describing the reason, which allows for the correct subsequent action (such as changing links in the case of code 301, a permanent change of address). HTTP defines several status codes for redirection, including: 300 multiple choices (e.g., to offer different languages); 301 moved permanently; 302 found (e.g., optionally to specify redirection for a particular reason, which may be unspecified); 303 see other (e.g., for results of cgi-scripts); and 307 temporary redirect.

The foregoing status codes operate according to a redirect target in a location header of a HTTP response. Below is an example of an HTTP response that uses the status code 301 "moved permanently" redirect:

```
HTTP/1.1 301 Moved Permanently
Location: http://www.example.org/
Content-Type: text/html
Content-Length: 174
<html>
<head>
<title>Moved</title>
</head>
<body>
<h1>Moved</h1>
<p>This page has moved to <a
href="http://www.example.org/">http://www.example.org/</a>.</p>
</body>
</html>
```

A redirection service may be part of an information management system that provides an Internet link that redirects users to desired content. A redirect link may be used as a permanent address, for example, as to content that frequently changes hosts. As an example, the redirection service "bit.ly" shortens URLs through use of the bit.ly domain or other custom domains to generate shortened links. Redirection is achieved using an HTTP Redirect (e.g., URL forwarding from the short URL to the full URL).

Another feature specified in the HTTP is known as a "referrer". For example, when a webpage link is clicked by a user, a browser application issues a HTTP request that includes a referrer field that indicates the source of the link (e.g., the last page the user was on—the one where he/she clicked the link). More generally, a referrer is the URL of a previous item, which led to the HTTP request being issued. The referrer for an image, for example, is generally the HTML page on which it is to be displayed. The referrer field is an optional part of the HTTP request sent by a browser application to a web server.

On the Internet, various server variables are available, which may be part of a request (e.g., Request.ServerVariables). A request may include one or more parameters that specify information (e.g., server_variable). As an example, a variable "REMOTE_ADDR" may be specified as a parameter for the IP address of a remote host making a request, noting that an IP address can assist in geo-location. As an example, consider a browser application running on a computer with a connection to the Internet and, thus, an IP address. A user, using the browser, can enter a domain name for a webpage such that the browser instructs the computer to send a request to retrieve the webpage. To allow a server hosting the webpage to respond to the request, the request typically includes the IP address of the sending computer (i.e., where the information should be sent).

Depending on configuration, a server may also respond by sending a cookie (e.g., which may be stored by the browser application). A cookie includes some information, which a browser application may instruct a computer to send upon a subsequent request.

While some examples mention "browser" or "browser application", any application that allows for access to the Internet (e.g., using the HTTP) may be configured to make a request. As an example of a type of application, consider the various 1OS® apps that may be implemented on an IPHONE® or IPAD® device such that the devices can send a request. An 1OS® or other app may also include an ad (e.g., a banner, etc.) where activating the ad (e.g., clicking, tapping, etc., on a link graphic) causes the device running the app to send a request (e.g., an HTTP request).

With respect to connections to the Internet, a device may include circuitry to connect via wire, wirelessly or both via wire and wirelessly. As to wireless connection, a cellular or other network may be intermediate to the Internet (e.g., 3G, 4G, BLUETOOTH™, etc.).

On the World Wide Web, various entities exist in the realm of e-commerce. In a system known as affiliate marketing, a publisher can be any type of Web site, app, etc., for example, from a well-known destination that offers consumers a range of shopping opportunities to a blogger that's just beginning to attract an audience to an app developer. As a loyal following is built, opportunities exist via affiliate marketing to monetize the site, the app, etc. by earning commissions. In such a scheme, the publisher can become an affiliate of an affiliate program where the publisher can displays ads, text links, or product links (e.g., from an advertiser or other entity) in return for a commission when a sale is made or when a lead is acquired. A sale may be tied to a specific action such as filling out a form or downloading a trial.

One affiliate network is LINKSHARE®, which manages various different affiliate programs. LINKSHARE® facilitates relationships between publishers and advertisers by providing the underlying technology that manages links, tracks results and commissions, and sends payments.

An affiliate program may operate as follows: a site owner (e.g., affiliate or publisher) offers goods or services of a merchant for sale on its site by including an "affiliate link" to direct a user to that merchant for a good, goods, a service, services, etc. When a user (e.g., a visitor) clicks on the affiliate link, an identification code is associated with the click (e.g., via a cookie) and in the event that the user takes an appropriate action (e.g., a visit, a conversion to a lead, a conversion to a sale) then the affiliate (i.e., the site owner) is paid by the merchant. The merchant or affiliate network will also usually provide tools for the affiliate to monitor various metrics, such as the number of visitors sent to a merchant site, the number of clicks or sales generated, and the earnings accumulated. Affiliate relationships may be established either with each merchant directly (e.g., amazon.com), or through an established third-party affiliate network (e.g., LINKSHARE®, TRADEDOUBLER®, PHG®, COMMISSION JUNCTION®, etc.).

As an example, a redirection service may route a click on the World Wide Web, optionally with referrer information or affiliate information that may benefit parties involved in transactions for goods, services, etc. In various examples described herein, a service may be associated with a redirection service. As an example, information may be acquired or otherwise accessible as a result of performance of a redirection service. In various examples described herein, a method, a system, etc. may acquire, accesses, process, etc. such information.

BRIEF DESCRIPTION OF THE DRAWINGS

Features and advantages of the described implementations can be more readily understood by reference to the following description taken in conjunction with the accompanying drawings.

FIG. 8 is an example of a system (e.g., a server or other computing device) and an example of a method that may transmit, receive, etc., data structures;

FIG. 9 shows examples of a scheme, implementations, criteria and information;

FIG. 12 shows an example of organized information.

FIG. 17 shows examples of information associated with digital media;

FIG. 18 shows an example of a system and examples of methods;

FIG. 20 shows an example of code associated with an example of a rule testing tool.

DETAILED DESCRIPTION

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Major e-tailers (e.g., ITUNES® retail, AMAZON® retail, etc.) often create localized storefronts for countries in which they do business. For example, ITUNES® store and the APPLE® app store have 155 different international storefronts. So when a visitor from Australia clicks a link to a tune on a website hosted in Germany, he or she is automatically sent to the storefront for Australia.

Issues may arise as each country storefront may have distinct product IDs for various items in its library. For example, a product ID for Australia may not match the one a link references for Germany. If not, the Australian visitor may be presented with an error message rather than the product he or she was looking to buy. Such an issue may be referred to as "geo-fragmentation" (e.g., where a shopper cannot buy through a link of a website and, for example, where the website owner does not get credit for referrals).

As an example, an engine may translate a link to ensure it references the correct product ID in an international visitor's storefront. By enabling a person to buy the digital product, such an engine may also help ensure appropriate credit for commissions on subsequent purchases.

As an example, a service may allow international visitors who click a link (e.g., in a website, in a social post, through an app, an ad, etc.) to be sent to the right product in the right store, rather than an error message; visitors may buy the product, and a proper party get credit for the sales generated for the e-tailer. As an example, a service may include circuitry that act to effectively update one or more links, for example, even if an e-tailer changes the ID on its end. As an example, a service may include circuitry that can generate a report, for example, consider a dashboard report that may consolidate information across products, platforms and affiliate programs in a system for the service, for example, to ease account management.

Figure 1:
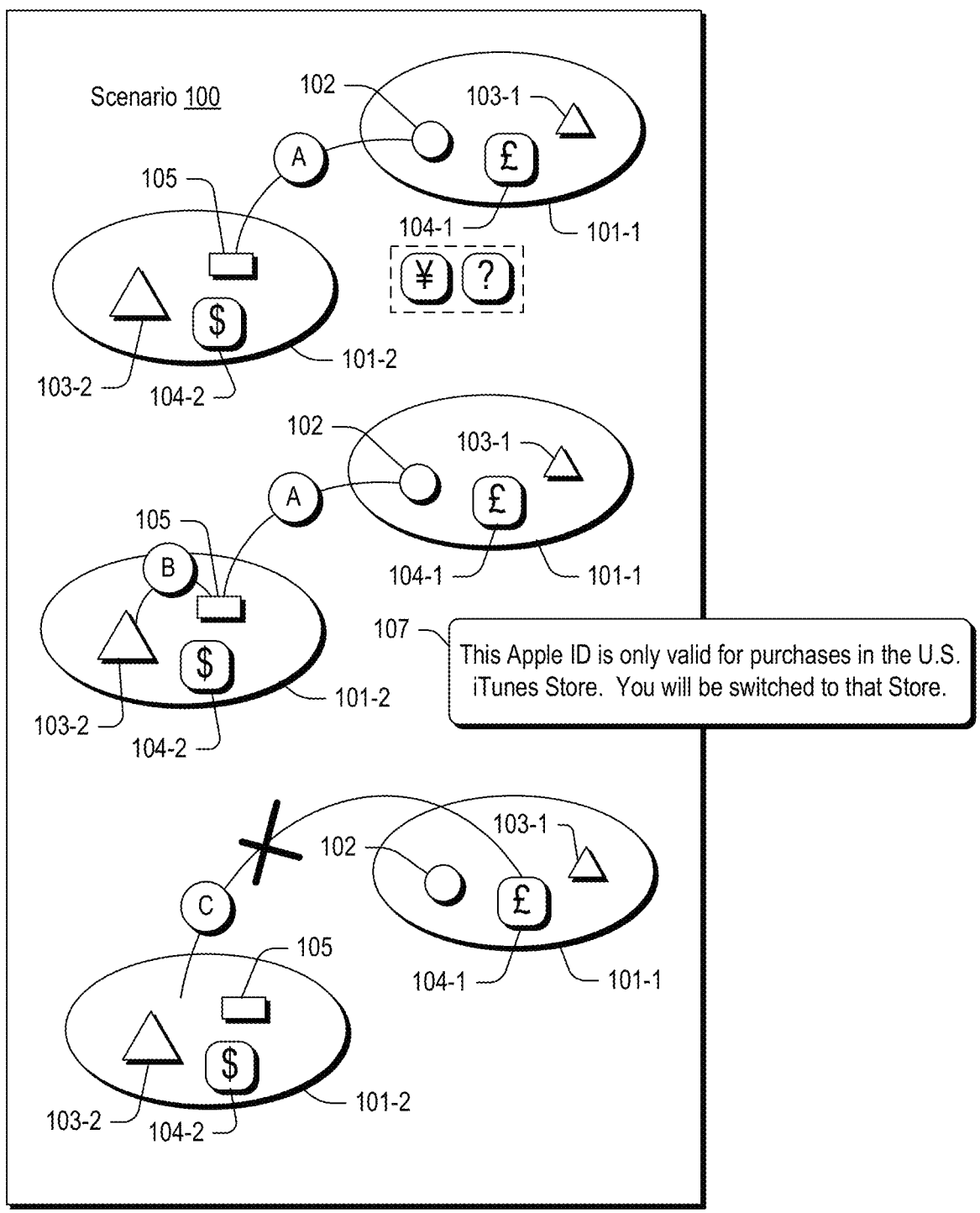
FIG. 1 is an example of a scenario for a user in a first region accessing a site in a second region.

FIG. 1 shows a scenario 100 that includes a first region 101-1 and a second region 101-2 where at least one difference exists between these two regions that may impact a transaction. A difference may exist as to currencies, taxes, intellectual property rights (IPRs), digital rights management (DRM), supplier, licensing, etc. In the example of FIG. 1, the difference pertains to currency in that the first region 101-1 uses, primarily, a currency that differs from the primary currency of the second region 101-2.

As to the region 101-1, it includes a user 102 using a browser application to access the Internet, an Internet storefront 103-1 (e.g., for transactions involving goods or services) and a financial institution 104-1 (e.g., a bank, a credit union, etc.). The region 101-2 includes a website 105, an Internet storefront 103-2 that has a relationship with the Internet storefront 103-1 and a financial institution 104-2.

As shown in FIG. 1, the user 102 initiates a communication "A" with respect to the website 105. The communication "A" activates a link of the website 105 that causes issuance of a request "B" for a resource associated with the Internet storefront 103-2. For example, the website 105 may be that of a recording artist where the website 105 provides one or more links for purchase of digital media from the Internet storefront 103-2.

As shown in FIG. 1, where the user 102 initiates a financial transaction with the Internet storefront 103-2 for purchase of a good, a service, etc., the transaction is forbidden because it violates one or more rules. For example, where the user 102 has an account with the financial institution 104-1 in region 101-1, the Internet storefront 103-2 may not honor a transaction with that account "C" because it is in a foreign currency.

As mentioned, a reason or reasons for denial of a transaction may be based on a factor or factors other than currency. For example, where the Internet storefront 103-2 provides goods, services, etc., based on a regional license that pertains to the region 101-2 only, it may be illegal for the Internet storefront 103-2 to sell, provide, transmit, etc., the goods, services, etc., to one or more other regions. As another example, where taxes are to be applied by law, a system may not be in place to collect taxes or deliver tax payments. As yet another example, where the goods, services, etc., are restricted by law (e.g., technology, moral issues, etc.), the transaction may be denied.

As an example, an identifier for an item (e.g., a product ID) may be inappropriate for a particular storefront, may be outdated, erroneous, etc. For example, in some instances a user to an ITUNES® storefront may receive an error message such as the error message 107 (e.g., "This APPLE® ID is only valid for purchases in the US ITUNES® store. You will be switched to that Store"). In such an example, a user may become confused, unable to transact with the US ITUNES® storefront, etc. Further, if a transaction does occur, information as to origination, affiliate program(s), etc. may be lost, inappropriate, inoperable, etc.

Devices that can be operatively coupled to the Internet continue to emerge, for example, in form factors such as mobile, smart appliances, wearables, etc. Such growth increases the number of paths across devices, operating systems, and countries as to Internet traffic. Where a user desires to make buy, license, etc. an item, getting that user to an appropriate destination can present challenges. As an example, consider sending a request from an ANDROID® OS device to buy an item from an IOS® app store, or sending a request from a US-based device to amazon.co.uk. Complexities can give rise to a "purchasing gap", for example, a rift between a product being promoted and where an individual would like to (e.g., or must legally) purchase that product.

As an example, another concern may be that a product URL lacks information, for example, such that there is no way to determine what device initiated a request (e.g., clicked a link). As a device or devices may be associated with an entity (e.g., owner, company, etc.), lack of such origination information may confound preferential pricing, shipping, processing, etc.

As an example, a redirection service can generate links that can, for example, work across devices, countries, operating systems, and stores to improve connectivity. Such a service may act to consolidate traffic and overcome issues associated geo-fragmentation (e.g., an e-tailer's storefronts being separate per country or region). As an example, a generated link may help deliver traffic to an intended item in an appropriate storefront, which may increase conversion (e.g., successful transaction for the item).

As an example, a service may include circuitry that can geo-target, translate, and affiliate a link. For example, a server can include one or more processors, memory, instructions stored in the memory executable by at least one of the one or more processors and a network interface that can receive information associated with a request and geo-target, translate and affiliate in less than about a second. In such an example, delay is minimal and unlikely to detract from user experience.

As mentioned, emerging and growing technologies such as shifts toward mobile purchasing as well as online retailers expanding globally through country and region-specific storefronts, pointing device traffic to the "best" place can be challenging (e.g., users on different devices, or different countries can potentially get a poor user experience with raw links while an e-tailer may experience a lost sale, etc.).

As an example, a redirection service can, for example, direct an IPAD® device user in Germany, or an ANDROID® OS device user in Japan, to a best possible destination (e.g., a tailored destination). As an example, a redirection service system may include a computing device that can receive a product link (e.g., ITUNES® link, AMAZON® link, etc.) and generate a "globalized" link that can be used to automatically determine a "best match" in individual geographical storefronts. As an example, a dynamic target approach can generate scenarios based off country, device, operating system, or date to route traffic to different destinations for a customized experience. As an example, a link management service may provide for editing links, for example, after being published, for example, to change destinations, to add customization(s) as to how traffic is routed, etc. As an example, a service may group links and tracking information (e.g., as to marketing efforts, campaigns, etc.). As an example, a service may generate information as to consumer buying habits (e.g., via processing links to uncover behaviors, etc.). As an example, a service may add and manage affiliate parameters and automatically assign appropriate information, for example, based off location of a device that initiates a request (e.g., a consumer's location).

As an example, a redirection service can generate a link that can direct traffic originated by a device of a user to an appropriate storefront for that device. As an example, such a service can include defining one or more scenarios where a click might go to a particular website, for example, based at least in part on type of OS of a device. As an example, a redirection service may generate a link that can appropriately handle traffic from multiple types of devices, multiple storefronts, etc. For example, consider an application (e.g., an "app") available in an ITUNES® storefront and in an AMAZON® storefront, a generated link may allow for substitution of two separate links. In such an example, the generated link may route traffic differently based on, for example, one or more of a user's location, device, operating system and date of a click. In such an example, hurdles such as no ITUNES® store on Kindle® devices and no ANDROID® store for 1OS® devices may be mitigated. As an example, a system can include circuitry that can generate a link that may be customized to resolve differently based on one or more factors such as, for example, date, OS, device type, and country.

As an example, a system may direct traffic in a manner that can account for destination dynamics and/or source dynamics. For example, if a product is not available for a specific device or storefront, or it is desirable to resolve differently based on location, device, or specific date, traffic may be routed to an appropriately determined destination (e.g., a next best option). For example, options may include one or more of a YOUTUBE® site, a SPOTIFY® site, a GOODREADS® site, etc. As an example, a generated link may be associated with a whitelist of external domains (e.g., amazon.com, itunes.apple.com, barnesandnoble.com, play.google.com, goodreads.com, rdio.com, audible.com, deezer.com, kobobooks.com, pandora.com, spotify.com, spotify://, youtube.com, slacker.com, vimeo.com, soundcloud.com, books.google.com, vevo.com, etc.). As an example, a whitelist may be customized, optionally based on one or more criteria and, for example, traffic may be directed to one or more whitelisted domain based at least in part on one or more criteria.

As an example, a service can include a link creator tool. For example, consider a server that includes circuitry that can receive a product URL and present one or more target options for that product URL. In such an example, a link may be generated that associates that product URL with one or more target options. In such an example, a link may be generated that can direct traffic from a device type, a device OS, a device location, a time, etc. to a particular destination. As an example, a link creator tool may include rules that can be applied and associated with a link. As an example, a link creator tool may include functions that can be applied and associated with a link.

As an example, a service can include a link tester. For example, a computing device may include an interface that can receive a link and then process the link to determine one or more characteristics of the link. In such an example, the link tester may test a link for a plurality of scenarios. As an example, consider testing parameters listed below, which may be implemented to generate one or more scenarios.

Parameters: ISO2/XX (e.g., test by country using any two digit ISO2 Country Code ("XX") such as US, GB, DE, etc.); targetos (e.g., test by OS such as ANDROID® OS, 1OS® OS, MAC® OS X® OS, WINDOWS® OS, WINDOWS® phone OS, WINDOWS® RT® OS, etc.); targetdevice (e.g., test individual devices such as an PAD® device, an PHONE® device, an (POD® device, a KINDLE® device, a KINDLE® FIRE® device, etc.); targettime (e.g., test a specific date and time such as YYYY-MM-DD, MM/DD/YYYY, etc.); etc.

Figure 2:
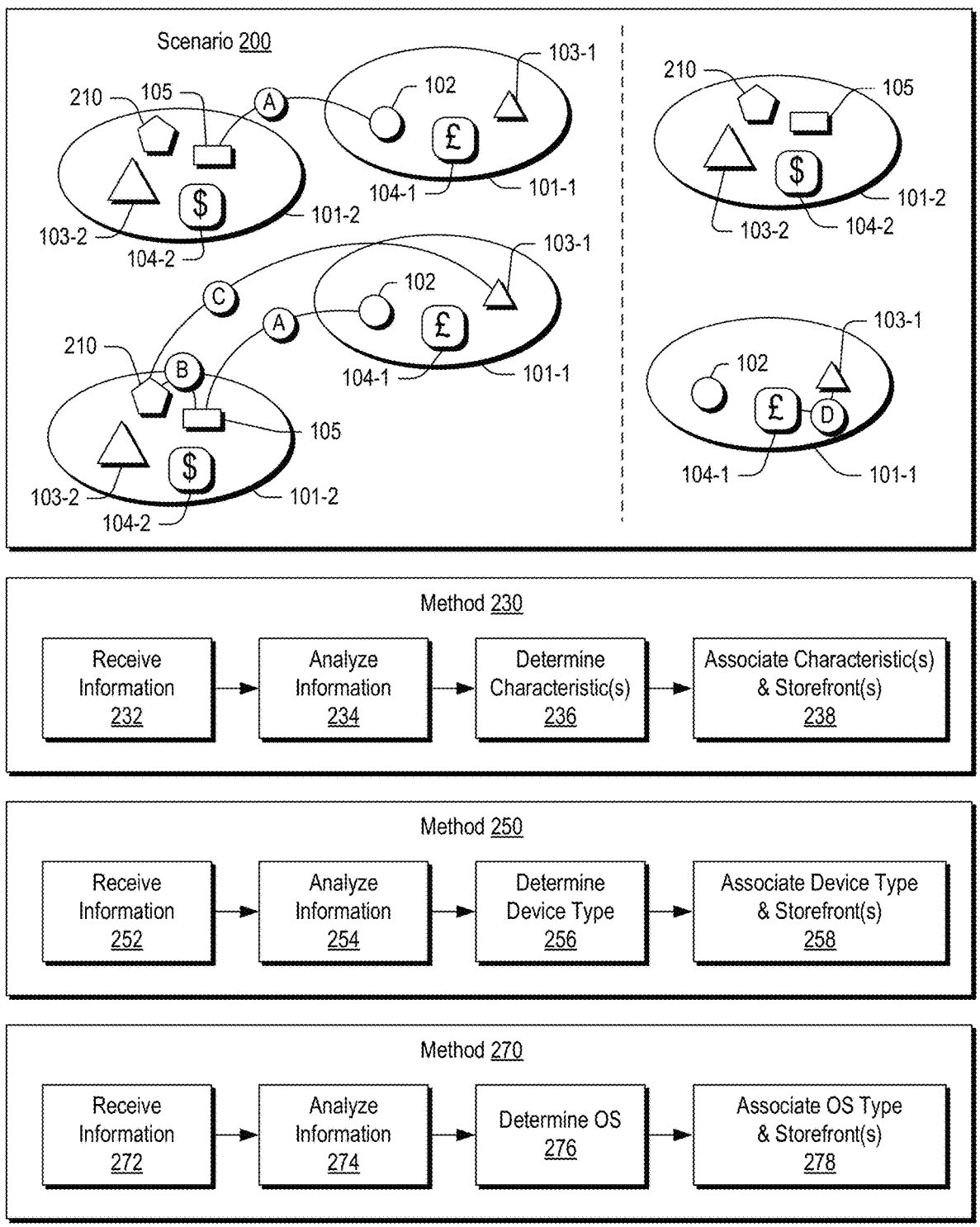
FIG. 2 is an example of a scenario for a user in a first region accessing a site in a second region with redirection.

FIG. 2 shows an example of a scenario 200, which includes the various components, actors, etc., of the scenario 100 and, additionally, a redirection service 210. FIG. 2 also shows an example of a method 230, an example of a method 250 and an example of a method 270.

In the example scenario 200 of FIG. 2, the redirection service 210 may have a relationship with the website 105 such that a click on a link of the website 105 issues a request to the redirection service 210 rather than the Internet storefront 103-2. In the example of FIG. 2, the redirection service 210 analyzes information associated with the communication "A" initiated by the user 102 in the region 101-1 to determine whether the communication "A" is coming from a region other than the region 101-2, which may have one or more conditions, restrictions, etc., with respect to the Internet storefront 103-2, the region 101-2, etc. Such an analysis may be a geo-location analysis. For example, Internet geo-location may be performed by associating a geographic location with an IP address (e.g., associated with a machine used by a user). IP address geo-location data can include information such as country, region, city, postal/zip code, latitude, longitude and timezone. Deeper data sets may be available to determine other parameters such as domain name, connection speed, ISP, language, proxies, company name, US DMA/MSA, NAICS codes, and home/business.

As an example, information may include information pulled from a request, which may not be specifically related to geo-location but which may be used for redirection. As mentioned, such information may include information such as, for example, one or more of operating system, operating system version, device type, date of request, etc. As an example, a system may include processing via a user agent, cookie, referrer data, etc. (e.g., information that may be passed back and utilized in a decision process).

In the example scenario 200, the redirection service 210 analyzes information, determines a geo-location of the communication "A" directed to the website 105 and then redirects the request "B" (e.g., activated by the communication "A") to the Internet storefront 103-1, which is believed proper for users that reside in region 101-1 (see, e.g., FIG. 25 for an example of a redirect using a protocol such as the HTTP). As shown in FIG. 2, the Internet storefront 103-1 can perform a financial transaction with the financial institution 104-1, for example, to complete a purchase by the user 102 for goods, services, etc. available from the Internet storefront 103-1 in region 101-1, as advertised on the website 105 in region 101-2.

In various examples described herein, a user, such as the user 102, may operate a device that can access the Internet where the device includes an application (e.g., a web browser or other application) configured to present a user interface that allows the user to activate an Internet link (e.g., via touch, voice, shake, etc.). Where the device is a cell phone (e.g., or other device with cell network circuitry), such a link may occur indirectly (e.g., first via a cell network and then the Internet).

As shown in FIG. 2, the method 230 includes a reception block 232 for receiving information, an analysis block 234 for analyzing information, a determination block 236 for determining one or more characteristics and an associate block 238 for associating one or more characteristics and one or more storefronts.

As shown in FIG. 2, the method 250 includes a reception block 252 for receiving information, an analysis block 254 for analyzing information, a determination block 256 for determining a device type and an associate block 258 for associating the device type and one or more storefronts.

As shown in FIG. 2, the method 270 includes a reception block 272 for receiving information, an analysis block 274 for analyzing information, a determination block 276 for determining an OS type (e.g., of a device) and an associate block 278 for associating the OS type and one or more storefronts.

As an example, the redirection service 210 may analyze information regarding a request, then determine device type and redirect the request "B" to the Internet storefront 103-1, which is believed proper for users that are using devices of that type (e.g., or may be previously configured). In such an example, the Internet storefront can then complete the purchase for the user 102 for goods, services, etc. available from the Internet storefront 103-1 specific to that device. As an example, a redirection process (e.g., as in FIG. 2), may use a device's operating system as a determining factor for redirection, for example, optionally paired with geo-location to direct the user to an appropriate storefront.

Figure 3:
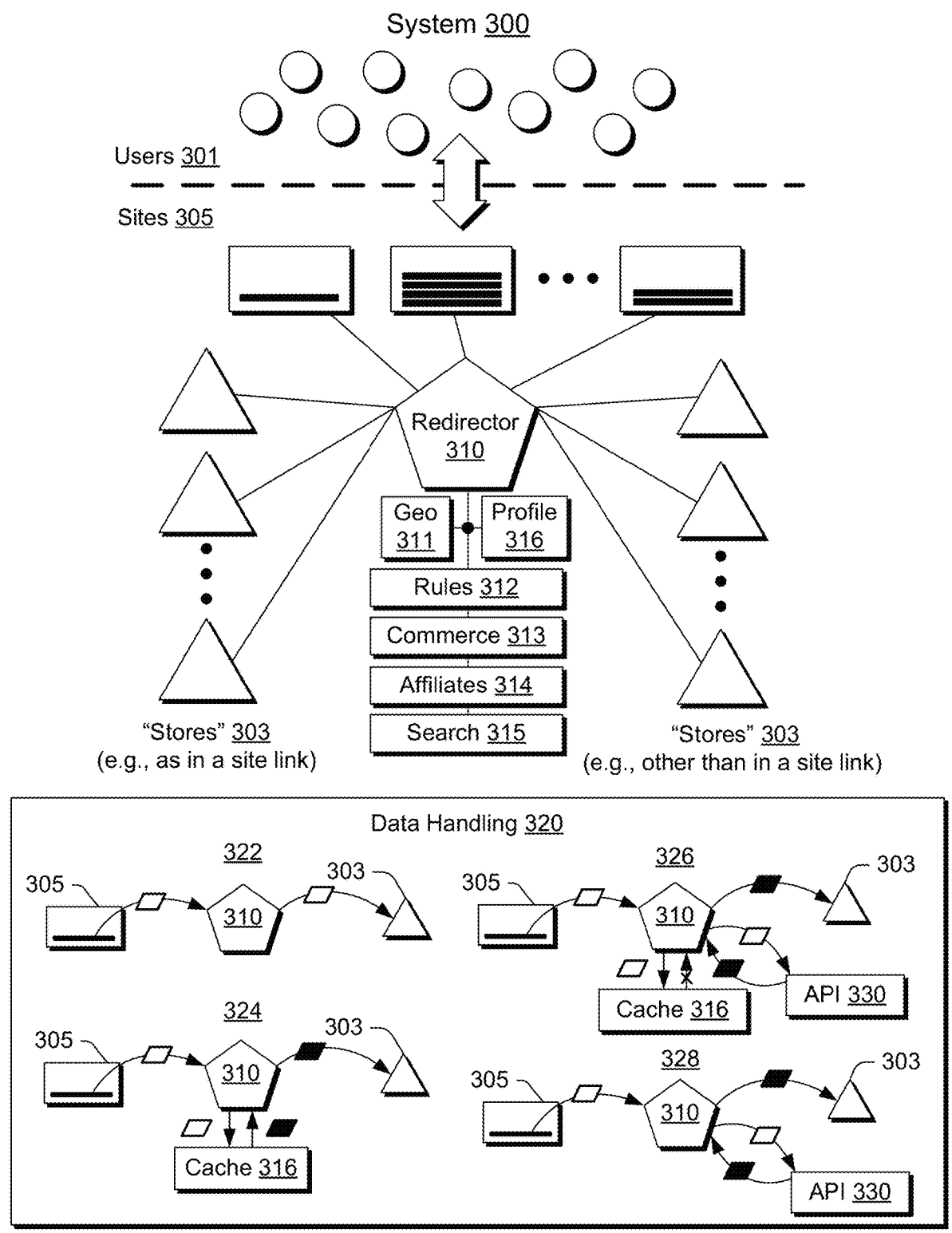
FIG. 3 is an example of a system that includes redirection services.

FIG. 3 shows an example system 300 that includes users 301, stores 303, sites 305 and a redirector 310 that provide redirection services to mediate requests issued by the sites 305 in response to links activated by users 301. The redirector 310 may be a server or servers and may be a network of equipment, optionally with equipment located in one or more regions.

In the example of FIG. 3, the redirector 310 includes various modules, which may be software, hardware, etc., provided locally, remotely, locally and remotely. As an example, a geolocator module 311 can provide for geo-location and, for example, a profile module 316 can provide for profiling (e.g., device, operating system information, etc.) of, for example, users 301 (e.g., users and/or user devices). A rules module 312 provides for one or more rules for a region or regions (e.g., for IPRs, DRM, currencies, taxes, legalities, etc.) and/or for a profile or profiles. A commerce module 313 provides for any of a variety of actions with respect to commerce (e.g., e-commerce), which may include a per click, a per month, per purchase, etc., type of service agreement. An affiliates module 314 provides for information as to one or more affiliates of, for example, one or more Internet storefronts. A search module 315 provides for search services with respect to information received via one or more sites as being related to a user communication and goods, services, etc., offered by one or more Internet storefronts.

In the example of FIG. 3, the redirector 310 is shown as being configured to service requests from the sites 305 (e.g., as initiated by an application running on a device with a network interface) and to redirect these requests to one or more Internet storefronts 303, which may match or mismatch (e.g., where country of origin and/or device type, etc. matches or does not match).

FIG. 3 also shows various data handling schemes 320 performed by a redirector 310 with respect to information associated with a link in a site 305. As an example, a link of a site 305 may be specified according to the ITUNES® store, for example, in the form of a lookup (LU) or a search via the ITUNES® store web service search API, which allows for placement of search fields in a link of a website, app, etc., to identify (e.g., lookup) or to search for content within an ITUNES® Store. For example, it is possible to identify an item using a unique identifier (e.g., an item ID). As another example, it is possible to search for a variety of ITUNES® store content using one or more search terms where an item may be an app, an e-books, a movie, a podcast, music, a music video, an audiobook, a TV show, etc. A feature of an API may allow for calling an ID-based lookup request to create mappings between a content library and a digital catalog. As described herein, "search" (e.g., including "searching") can include "lookup" (e.g., including "looking up"); thus, search or searching may include use of an item ID.

To search for content in an ITUNES® store, a so-called fully-qualified URL content request can be made to an ITUNES® store service. In response, the ITUNES® store may return a JavaScript Object Notation (JSON) format response. According to the ITUNES® store API, a fully-qualified URL has the following format:

http://itunes.apple.com/search?parameterkeyvalue where "parameterkeyvalue" can be one or more parameter key and value pairs indicating the details of a query.

To construct a parameter key and value pair, concatenation is performed for each parameter key (e.g., data field) with an equal sign (=) and a value string. For example: key1=value1. To create a string of parameter key and value pairs via concatenation, an ampersand (&) is used (e.g., key1=value1&key2=value2). The resulting string may be referred to as a data structure.

For the ITUNES® store, parameter keys include, as examples: term (e.g., URL-encoded text string to search for in an ITUNES® store such as "jack+johnson"); country (e.g., a two-letter country code for an ITUNES® store to search, where the default is the storefront for the specified country); media (e.g., media type to search for in an ITUNES® store such as "movie", where default is all); entity (e.g., type of results to return, relative to the specified media type such as "movieArtist" for a movie media type search, where the default is a track entity associated with the specified media type); attribute (e.g., attribute to search for in an ITUNES® store, relative to the specified media type such as "entity=allArtist&attribute=allArtistTerm"); limit (e.g., number of search results to return); lang (e.g., language to use when returning search results such as "en_us"); and explicit (e.g., a flag indicating whether or not to include explicit content in search results).

The ITUNES® store API also provides for receipt of lookup requests to search for content based on identifiers, including ITUNES® IDs and All Music Guide (AMG) IDs. ID-based lookups tend to be performed more quickly and to result in fewer false positive results. As an example, a fully-qualified URL for a specific ITUNES® store lookup request by ITUNES® artist ID is as follows:

http://itunes.apple.com/search?id=909253

For a lookup of the artist Jack Johnson by AMG artist ID, a URL is:

http://itunes.apple.com/lookup?amgArtistId=468749

For multiple artists by their AMG artist IDs, a URL would look like the following:

http://itunes.apple.com/lookup?amgArtistId=468749, 5723

To look up all albums for Jack Johnson, a URL would look like the following:

http://itunes.apple.com/lookup?id=909253&entity=album

To look up multiple artists by their AMG artist IDs and get each artist's top 5 songs, a URL would look like:

http://itunes.apple.com/lookup?amgArtistId=468749, 5723&entity=album&li mit=5.

In the example of FIG. 3, the data handling schemes 320 include: a scheme 322 where metadata (e.g., an ITUNES® store URL or other store directed URL) is received by the redirector 310 and passed to a storefront 303 (e.g., as a redirect); a scheme 324 where the metadata is received by the redirector 310 and compared to an information cache 316 where metadata is returned to the redirector 310 and passed to a storefront 303 (e.g., as a redirect); a scheme 326 where the metadata is received by the redirector 310 without an adequate response from an information cache 316 and thus submitted via an API 330 which returns metadata that is then passed to a storefront 303 (e.g., as a redirect); and a scheme 328 where the metadata is received by the redirector 310 and submitted via an API 330 which returns metadata that is then passed to a storefront 303 (e.g., as a redirect).

As an example, a process may include making multiple calls (e.g., to a cache, an API, etc.). Consider a first call that is a lookup to get metadata from a link followed by a second call that is a search that uses the retrieved metadata in an appropriate country.

According to the data handling schemes 320, the redirector 310 can operate to ensure that a redirect directs a user to appropriate content at a storefront. As mentioned, in various examples, a redirect may occur according to a protocol such as the HTTP (see, e.g., the HTTP 3XX example of FIG. 25). Thus, in the data handling examples 322, 324, 326 and 328 of FIG. 3 (or other examples), additional lines, arrows may exist, as well as additional entities (e.g., an application that activates a link, one or more entities as occurring or used for Internet communications, etc.). In various examples, a line or lines may represent a logical flow (e.g., without specifics as to a particular protocol).

Figure 4:
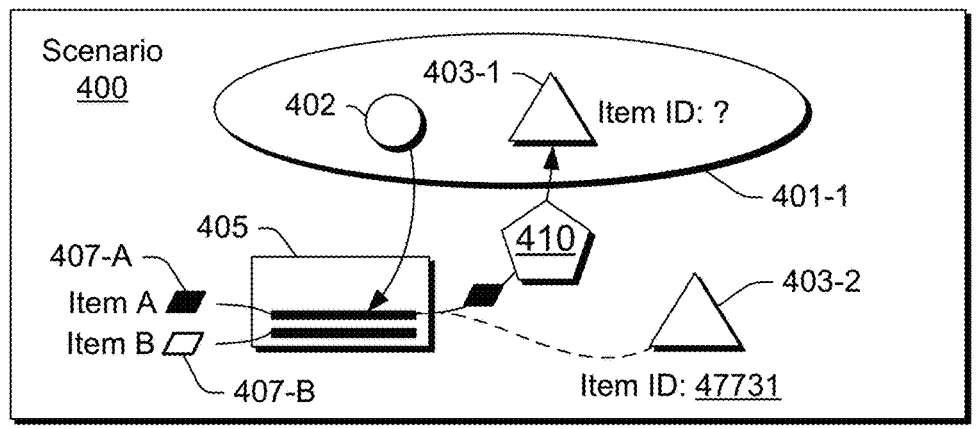
FIG. 4 is an example of a scenario and an example of a decay process.

As described with respect to FIG. 4, situations may arise where metadata, which may include one or more IDs, from a site do not exactly match that for a storefront in another region where a user may be redirected. In other words, the metadata may be specific to an Internet storefront in a region in which the site resides (e.g., where the IP address of the site indicates that the store resides) and not be particularly fit for locating a resource at one or more other Internet storefronts (e.g., associated with the storefront) in other regions.

FIG. 4 shows an example of a scenario 400 where a user 402 in a region 401-1 activates a link of a site 405 for an item A, which has associated metadata 407-A. The user 402 may be operating an application such as a web browser or other application that may be configured for communication via a protocol such as the HTTP. As indicated, the link for item A can correspond to an item ID of an Internet storefront 403-2 in a region that differs from 401-1. In the example scenario 400, the item ID may be a numeric string (e.g., "47731"). As mentioned, for an ITUNES® store, various types of IDs may be provided in a URL. Additionally, or alternatively, metadata may include one or more parameter values (e.g., term, country, media, entity, attribute, limit, lang, explicit, etc.).

For the scenario 400, where the user 402 cannot finish the process with the Internet storefront 403-2 (e.g., according to one or more rules), the redirector 410 may redirect the request, including its metadata 407-A (e.g., ID(s), parameter(s), etc.), to the Internet storefront 403-1. As to identifying content (e.g., item A) at the Internet storefront 403-1, various situations may arise, as explained with respect to a decay process 430, which may be hierarchical in its logical structure (e.g., optionally provided as a state machine). As an example, metadata may be translated based on best match logic to be relevant to another store.

The decay process 430 may proceed via one or more relational operations such as an exact match 432, a perfect match 434, a best match 436, an album/artist 440, a search 450, a media format 460, a storefront 460, a user defined 482, etc. The decay process 430 may proceed via decisions that form a decision tree (e.g., or a state diagram), which may be tailored based on metadata provided by a link. For example, where metadata includes an item ID for an Internet storefront in one region and, if an exact match does not exist for that item ID in an Internet storefront in another region, the decay process 430 may proceed via a storefront operation 470 that redirects a user to an Internet storefront in the appropriate region.

While particular hierarchy of decay logic is described in the example of FIG. 4, decay logic may be configured to account for various factors (e.g., based on learning, redirection service options, etc.). Further, while the example is described with respect to certain goods (e.g., digital music), a hierarchy and decay process may be tailored with respect to the goods, services, etc. (e.g., for applications, appliances, tools, etc.). Thus, categories such as "album" or "artist" may be, for example, "application suite" or "developer".

The decay process 430 may include caching information and optionally learning via a learning algorithm. For example, the data handling schemes 324 and 326 may include caching in the cache 316 as well as learning to manage cached information to expedite redirects and to enhance user experience (e.g., to redirect a user to content that is exact or deemed acceptably relevant to desired content). Such an approach may include determining whether a user navigates away from a storefront or otherwise interacts with the storefront in a manner that indicates that a redirect may not have been optimal (e.g., optionally including analysis of times, comparisons with other shoppers, etc.). For example, where a user wants to purchase a song (e.g., mp3 or other format file), if the redirect delivers the user to the song but recorded by a different artist, the user is likely to interact with the storefront until she finds the correct song, if available.

As an example, a redirect service can provide additional intelligence around commerce links by allowing a link to be rebuilt automatically, based off information surrounding the user, the device, the connection speed, or other relevant pieces of data. Examples of inputs that can be used may include, for example, one or more of the following:

User agent
    Type of Device
        Example: Types of laptops
        Example: Types of tablets
        Example: Types of phones
        Example: Types of PCs
        Etc. (TVs, GOOGLE® glass/wearables, etc.)
    Type of Operating System
    Type of Browser Example: SAFARI® browser, CHROME® browser, etc.
    App, or category of app Example: ANGRY BIRDS® app, one or more other apps, or "games", etc.
Time, both absolute (UTC based) or relative to a person or the day
Weather
"Translation result"—E.g., different results based on if an "Exact",
"Perfect", or "Best" match is possible.
    E.g.: Affiliate clicks could be eligible to be shared when the result is a Best Match or lower in the decay algorithm.
    E.g.: Instead of decaying to search links the service could be programmed to redirected to an assigned home page or the original link.
Product/Media Type of good referenced in the link.
    E.g.: Physical goods could be treated in one manner while digital goods are treated differently.
    When a specific item
        E.g.: A link to a high price point, high converting, or high
        EPC item might be treated differently.

Language
Referrer
    E.g.: Links clicked from FACEBOOK® site could be redirected to a different location compared to the same links clicked from TWITTER® site or LINKEDIN® site.
Number of prior clicks/interactions from a specific device.
    E.g.: First X clicks from a link have one behavior while subsequent Y clicks have a different behavior.
Geography—extended
    Publisher supports the affiliate program in country
    Is there an affiliate program in country
    Does an advertiser have a storefront in said country.
        Granularity Results could vary based on continent, country, state or providence, city, zip code, and/or area code
    Timezone
    Urban vs. rural locations
    Terrain
        E.g. Hills, lakes, oceans or desert.
    Traveling
        E.g.: Traveling outside of a region where the user normally purchases, on a plane, on a boat, in a car
Wireless connection
    E.g.: 4G, 3G, WiFi, satellite, etc.
Network connection speed
    E.g.: broadband, dialup
Network issues
    E.g.: user connection drops and can't complete the process.
    E.g.: An issue happens on the service side however, the link must finish redirecting.
    E.g.: There is an issue with the storefront (Example: ITUNES® storefront is down).
Identifying a specific user
    E.g.: A service know that person X prefers shopping on an AMAZON® store site while person Y prefers shopping on an ITUNES® store site.
    Age of user/device
    Gender of a user
    Other demographic/psychographic information about the user.
Identifying a specific device
    E.g.: mobile device X has had no conversions for AMAZON® clicks while device Y has converted on clicks to sales inside an ITUNES® store.
    Knowing vs. not knowing anything about the device.
Current "Skim" or "Click Share" rate.

As an example, a redirection service may automatically redirect a user clicking on a publisher's link after determining a combination of one or more factors (see, e.g., above). As an example, if a link is clicked from a mobile device, the link could be redirected to the publisher's mobile version of the storefront, such as an AMAZON® app instead of opening amazon.com. Alternatively, for example, if an IP address has previously visited the AMAZON® and GOOGLE PLAY® stores the same number of times, but has purchased from the GOOGLE PLAY® storefront, but never from AMAZON®, the redirection service could "learn" this behavior and send the IP address to GOOGLE PLAY®.

As an example, a system may offer a Publisher the ability to define the redirection service's decay process manually. For example, consider the ability to add manual destinations based off the device including device type, operating system, click date, etc. of a click. In such an example, an override of a standard decay hierarchy may occur and allow a redirection service to provide routes outside of the original Internet storefront. For example, a link could be created within the redirection service that defaults to an ITUNES® link, but has override destinations for ANDROID® devices to go to a separate storefront, like AMAZON®, since non-APPLE® mobile devices may be unable to directly purchase through an ITUNES® site. Such a process may be performed when a Publisher is adding links to the redirect service, and is given the option to add additional "scenarios" to route the user dynamically based off their metadata.

As an example, a redirection service may include a tool, for example, which is placed on a Publisher's digital property to determine the same information about the user as when the redirect service is used for clicks. Such a tool may be in the form of a JavaScript snippet, iFrame, or other visual or hidden element, for example, activatable on a web page load for the Publisher. Such a tool may automatically determine a user's location, device type, or other pertinent information, and display the appropriate link behind an appropriate badge for that individual user.

As an example, a website owner may integrate a redirection service's tool on her web page for her new mobile game, and a user in Germany with a KINDLE® device may navigate to that website from his mobile browser. In such an example, on the page load, the tool can determine the user's geo-location via the IP Address look up, determine the user's device via the user's user agent from the HTTP header, and then determine the appropriate badge and end destination to display to the user. In such an example, a "badge" with a link to the new game in the amazon.de app store may be appropriate, so the badge displays the German language equivalent of "Buy from amazon.de" and the hyperlink would route to that specific item. Once that link was clicked by the German user, the affiliate parameters of the Publisher can be added, when appropriate and provided to the redirection service.

As an example, an end user (person who clicked on the link) could also be allowed to set his preferences for a storefront he is most likely to purchase through via the tool on the Publisher's web site, and have those preferences saved for future visits. In such an example, the user could do so by interacting with the tool via a visual element to choose which storefront, language, or other related preferences they prefer for purchasing items. On saving those preferences, the user's information could be persisted to the redirection service provider's database, along with the user's metadata and a unique identifier. The same data could also be persisted, for example, via a cookie or related medium, to the user's device. In such a scenario, on the user's next visit, the IP address (and/or unique identifier) can be queried, cookie read, and their previous preferences used instead of the default preferences determined for an unknown user.

In the example of FIG. 4, the exact match 432 may correspond to situations where an ID is exactly the same across associated storefronts in different regions; the perfect match 434 may correspond to situations where the appropriate metadata matches perfectly across associated storefronts; and the best match 436 may correspond to situations where metadata overlaps to at least a certain extent (e.g., processing to remove brackets, parenthesis, etc., for live versions, deluxe versions of an album, while media type and artists names are the same, etc.).

In the example of FIG. 4, the album/artist 440 operation may correspond to situations where a match cannot be made at the highest level and thus a match is made at the next highest level and so on (e.g., cannot find a match of a song so redirect a track link to land on an album page, a bonus song only available on an album that is available in a specific country, cannot be found at the highest and next highest level then descend to another level such as artist, etc.). While various examples pertain to songs, various approaches may apply to other digital media including, for example, applications. As to applications, metadata may include categories, application developer, etc. Further, decay may apply to any of a variety of goods, services, etc. For example, an on-line retailer may provide books, small appliances, tools, etc. As an example, consider a tool that performs a specific function (e.g., a hex wrench of a certain size). A decay process may search for tools that can perform the same function (e.g., hex wrench size), optionally within sets of tools (e.g., a wrench set), materials of construction, handle size, etc.

In the example of FIG. 4, the decay process 430 may include the search operation 450. For example, if a match is not possible for a song at an album level or an artist level due to too many songs of the same name or false positives, then the search operation 450 may be initiated, for example, with one or more terms parsed from a URL, the site where the URL exists, an offsite catalog of products related to the URL, etc., to assist a user in finding what he desires. For the search operation 450, such a search may be initiated using an API or other features associated with one or more storefronts or other databases (e.g., AMG database, etc.). As an example, a decay process may perform a search that formulates a URL link to drop a user at a results page of a search performed using at least some metadata. Further, results from the search operation 450 may be analyzed as to relevance, number, etc., and a decision made as to whether such results should be communicated to a user, for example, via a redirect to a page at the originating site or via a redirect to a page at a storefront site or via a redirect to a page at a database site (e.g., AMG database, etc.). Where search results are deemed as being less than optimal, detracting from user intent, etc., the decay process 430 may proceed to another operation.

As shown in FIG. 4, the search operation 450 may include a search by genre operation 452 (e.g., user is dropped in a genre listings page for the same genre that the original item came from such as in response to no match for the band U2 and the song "With Or Without You", so drop to a "rock" genre page); a search by media type operation 454 (e.g., user is dropped at the front page of the store for the same media type, such as in response to not determining the genre of the U2 song "With Or Without You", so redirect goes the front page of the storefront).

As to the media format operation 460, the decay process 430 may include an option such that at any point in decay, a logical flag may be inserted to allow for the addition of other media formats (e.g., media types) to be included (e.g., to expand a search, number of results, etc.). For example, where an original link is for a digital music download on amazon.com but at a certain level (e.g., a definable level in the decay process), expanded media options may become available so that a search can start searching for CDs or digital download music videos. As to media formats, such formats may include categories: ebook (audiobook, paperback, hardcover, KINDLE® book); mp3 track (CD, music video); VOD TV Show (DVD, VOD Movie. VOD Rental), etc. The redirection service may optionally provide standard, customizable, etc., options for a client or clients (e.g., site owners, etc.). Such options may include learning that aims to provide an optimal user experience, commercial benefit, etc.

As mentioned, the decay process 430 may perform a storefront operation 470, to redirect to an entry page (e.g., home page) for a storefront. Such an operation may be a default operation, for example, where a link is malformed upon receipt by a redirection service, where a link cannot be properly parsed to initiation a process, where an error is thrown due to a problem with a link, etc.

As an example, a process may be defined to do nothing with an original link but send the user on as if an intelligent redirect process didn't exist. Such an approach may, for example, be used in situations where the user is coming from a region where a relevant match is not available.

The defined exit operation 482 is an example of another type of operation 480, which may or may not be part of the decay process 430. Such an exit may optionally be defined by a client of a redirection service (e.g., owner of a site), for example, to define an error page that a user would be redirected to at any point in a decay process by flagging where the decay should stop. As an example, a default may be to never show a client's error page and allow the decay to go all the way to the storefront. Consider a situation where a client only wants song tracks returned to users, i.e., the client never wants their users to be dropped to an album or lower. In such a situation, the client could define an exit operation to stop the decay process after the best match operation 436 (e.g., to redirect a user to an error page instead of decaying further).

In various examples described herein, a redirector may be a computer or computing system (e.g., a server) that includes an interface that receives a URL responsive to a user activating an Internet link via an application (e.g., a browser application, an application that presents a user interface for activating an Internet link, etc.) where the URL includes metadata for an item specified by a country-based Internet store; circuitry that identifies a base country of the user by resolving an Internet Protocol address associated with the user (e.g., according to a device running the application, etc.); circuitry that decides if the base country of the user differs from the country of the country-based Internet store; and circuitry that formulates, if the base country differs, a URL for redirecting the user to a country-based Internet store for a country that corresponds to the base country of the user. As an example, the interface may be a network interface operable according to one or more standards associated with the Internet. As an example, the circuitry that identifies may include hardware, software, etc., that resolves an IP address to identify a region. As an example, the circuitry that decides may include hardware, software, etc., that compares a code resolved from an IP address to a code associated with the country-based Internet store. As an example, the circuitry that formulates may include hardware, software, etc., that formulates a URL using memory and a processor, which may access information stored locally, remotely, or locally and remotely. As to the URL, it may provide for directly redirecting or indirectly redirecting (e.g., first redirecting to an affiliate).

As described herein, a computing system may include circuitry that determines whether an item specified by a country-based Internet store matches an item specified by a country-based Internet store for a country that corresponds to a base country of a user. In such an example, circuitry may parse URL metadata to issue a query to a database, issue a call specified by an application programming interface of the country-based Internet store, etc.

As described herein, a computing system may include circuitry that determines a best match for an item for a country-based Internet store for a country that corresponds to a base country of a user. Such a system may include circuitry that formulates a URL based at least in part on the best match, circuitry that parses the metadata for search terms, circuitry that issues a search to a database using at least one search term, etc.

As described herein, a computing system can include circuitry that formulates a URL that includes information for an affiliate of a country-based Internet store for a country that corresponds to a base country of a user (e.g., an affiliate identification code), circuitry that formulates a URL that redirects a user to a website of an affiliate of a country-based Internet store for a country that corresponds to a base country of the user, etc.

As described herein, a method can include receiving a URL responsive to a user activating a link via an application (e.g., where the application may be a browser or other application) where the URL includes metadata for an item specified by a country-based Internet store; identifying a base country of the user by resolving the user's Internet Protocol address; deciding if the base country of the user differs from the country of the country-based Internet store; if the base country differs, formulating a URL for redirecting the user to an affiliate website where the URL includes information for a country-based Internet store for a country that corresponds to the base country of the user; and, if the base country does not differ, formulating a URL for redirecting the user to an affiliate website where the URL includes information for the country-based Internet store. In such an example, the affiliate may be an internal affiliate or an external affiliate.

As described herein, a method can include determining whether an item specified by a country-based Internet store (e.g., according to an ID, descriptive data, etc.) matches an item specified by the country-based Internet store for a country that corresponds to a base country of a user (e.g., as specified by a code or resolved using an IP address). In such a method, if the item does not match, the method may include implementing a hierarchical decay process (see, e.g., example of FIG. 4) and formulating a URL for redirecting the user to an appropriate Internet store (e.g., or an affiliate website) based at least in part on the hierarchical decay process (e.g., results of a decay process, whether logical or informational).

In various examples described herein, various terms may be used such as: Publisher (e.g., a website owner, an application developer, a client of a redirection service, etc.); Affiliate (e.g., a Publisher, a website owner, a client of a redirection service that is also a member of an affiliate network/program such as LINKSHARE®, PHG®, TRADEDOUBLER®, etc.); User (e.g., a person that activates, e.g., "clicks on", a link on a site, an app, etc., where that site, app, etc., may be at least a client of a redirection service); Link on a Site or App (e.g., a link that redirects a user to a redirection service such that the redirection service can perform various acts); Redirection Service (e.g., a service that has, for example, publishers as clients and that can redirect users, as appropriate, for example, either directly to an appropriate Internet store or to an affiliate program site, which, in turn, redirects the user to an appropriate Internet store as determined by the redirection service); Advertiser (e.g., ITUNES®, AMAZON®, someone selling something via an affiliate program, etc.); Affiliate Network (e.g., LINKSHARE®, PHG®, TRADEDOUBLER®, an aggregator of advertisers and publishers, etc.).

Figure 5:
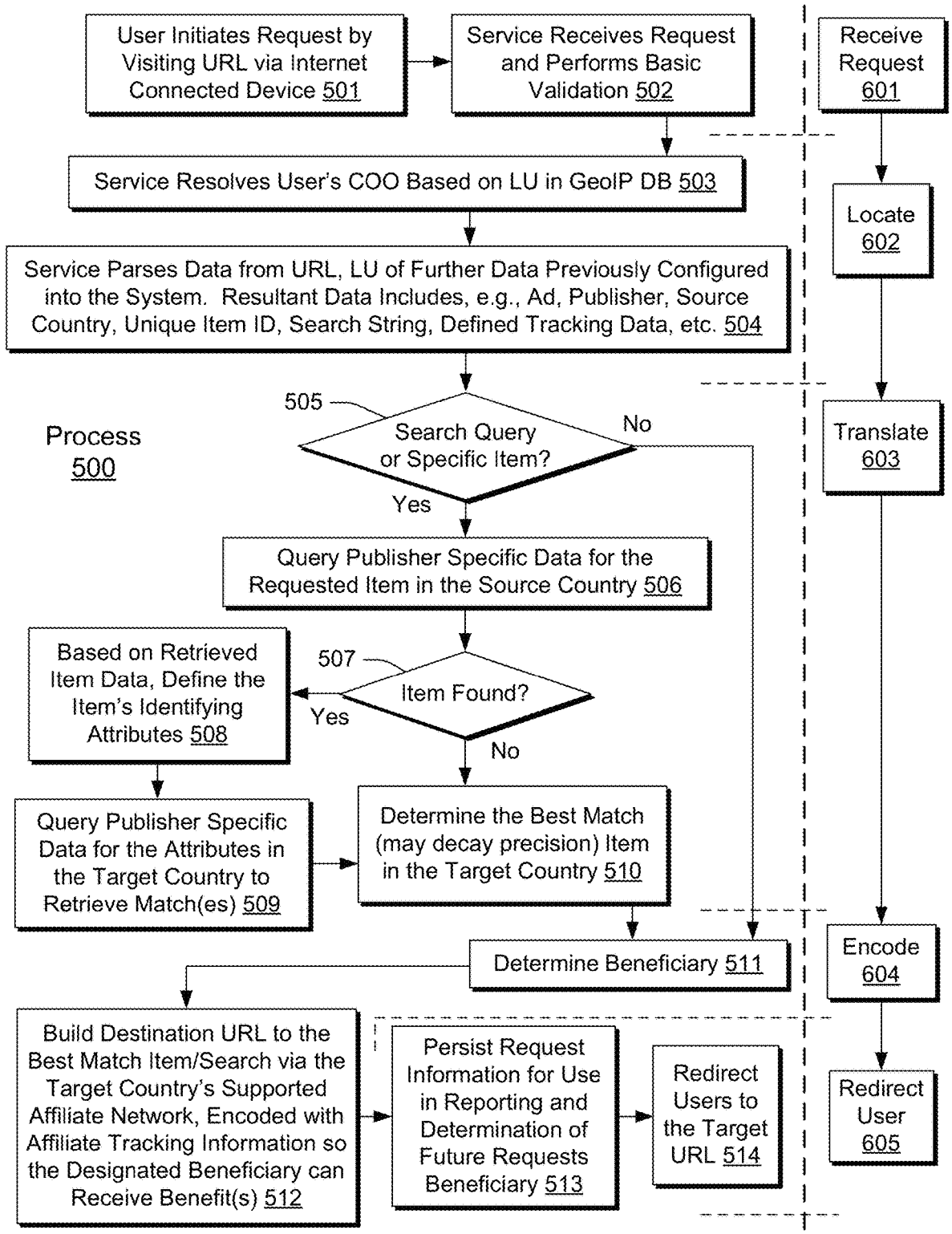
FIG. 5 is an example of an overview of a process starting with receiving a request through redirecting a user to an appropriate destination.
Figure 6:
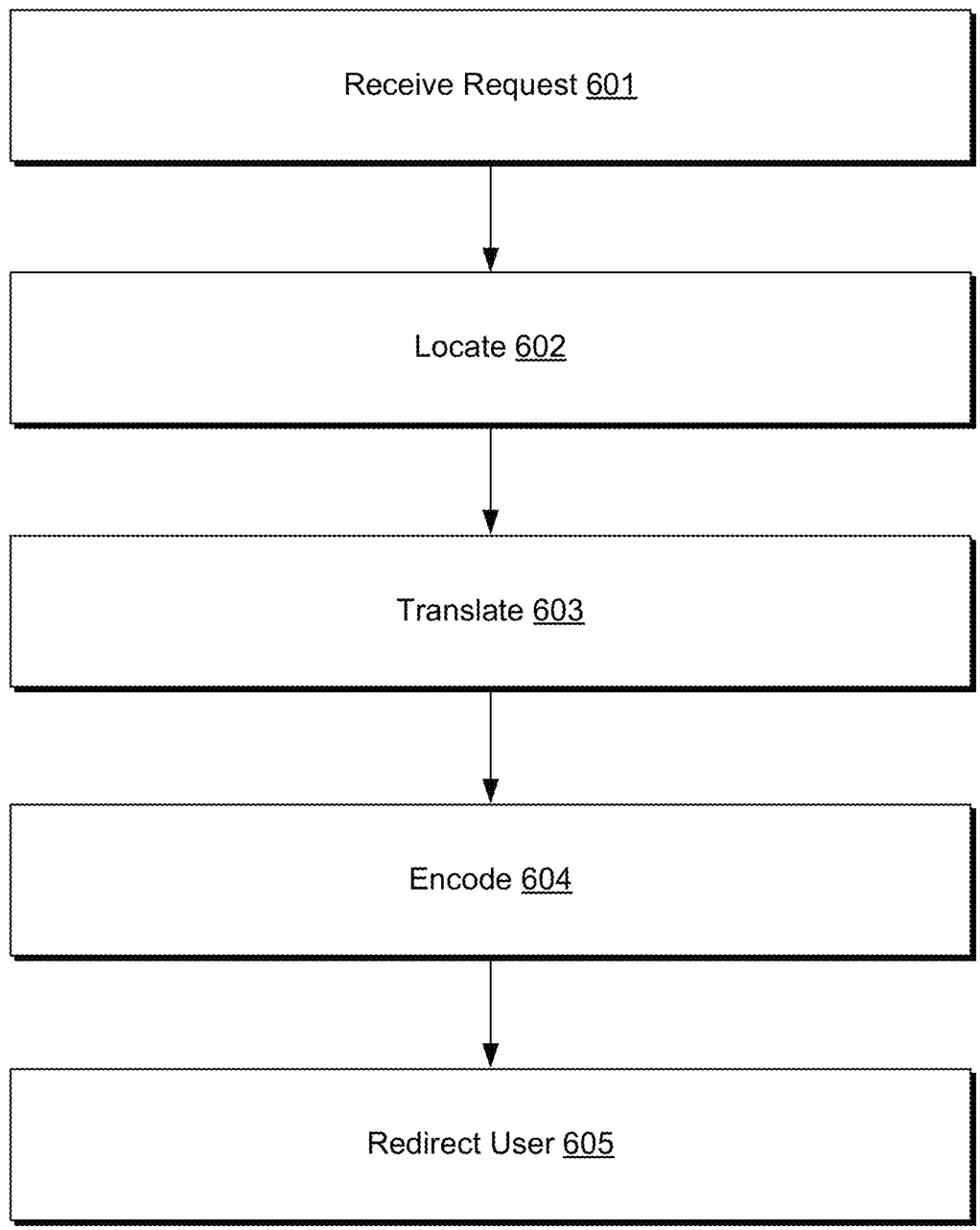
FIG. 6 is an example of a flowchart of details mentioned in FIG. 5.

FIGS. 5 to 6 pertain to examples of redirection services associated with affiliates. As an example, a redirection service may have a process to allow store multiple geographically segmented affiliate program details in order to be used simultaneously through the use of a single URL on a website or from within an application (e.g., an IPHONE® application or other application). In such an example, the approach can involve detecting a user's IP address through a link and determining the user's geographic location. The original URL may then be translated from a source country to a URL specific to a country that matches the user's location. Further, a new URL may be encoded with the geographically correct Affiliate network's tracking information stored within the redirection service, then the user redirected to the resulting URL. As an end result, the user reaches the appropriate destination in the geographically correct online storefront with proper affiliate tracking information in place.

Traditionally, an "affiliate program" for an international brand is actually a series of separate affiliate programs, each for a specific geographically specific online storefront. These affiliate programs are typically administered through separate Affiliate Networks (the companies that aggregate affiliate Publishers and Advertisers, provide account management, tracking and payout) as Affiliate Networks tend to also be geographically segmented. They also tend to be clustered around certain regions or continents if multinational.

In comparison, many Internet based retailers (Advertisers) have a world-wide following, which is also true for many popular content type websites or applications (Publishers). This creates a problem for affiliate Publishers as they are restricted into making commissions only on the sales they generate within one geographic region and do not tend to capitalize on the sales from other online storefronts. Generally, Publishers will use only one affiliate program: the one that is associated with the store in the country where the largest amount of their traffic originates.

Using a redirection service, the Publisher's specialized affiliate links would first send clicks to the Redirection Service Provider, where the traffic's proper country, device type, and operating system is determined systematically by the service. After determining that information, the service dynamically redirects the click to a new, custom URL that is specific to the geographic, device, and/or operating system appropriate target online storefront. The click is redirected through the proper Affiliate Network (as determined from the user's geographic location) to the correct store.

As described herein, a redirection service may provide for allowing multiple geographically and/or device segmented affiliate programs to be used simultaneously through the use of a single URL on a website (e.g., accessed via a web browser application) or from within an application (e.g., an IPAD® application, an IPHONE® application, an ANDROID® application, etc.). As an example, a process can use logic to determine the geographic location of the user and then translate and encode a URL into a geographically relevant affiliate link which includes the affiliate tracking information and directs the user into the appropriate storefront based on location.

In various examples described herein, a redirection service may allow Publishers to utilize more than one geographically and device segmented affiliate program through multiple Affiliate Networks and storefronts to properly affiliate each link as it passes through the redirection service.

FIG. 5 shows an example of a process 500 that occurs when clicking on a link. The process 500 starts with a link on the Publisher's property initiated by a user 501 and finishes with the final redirection 514, the user ending at the most relevant page in the appropriate online storefront. Also shown in FIG. 5 are blocks 601, 602, 603 and 605, which are part of a process 600 shown in FIG. 6, which represents a breakdown of the process 500 into five general steps: Receive Request 601, Locate 602, Translate 603, Encode 604 and Redirect User 605.

As shown in FIGS. 5 and 6, the process 500 or 600 starts when the service receives a request through a specialized affiliate link (Receive Request 601). For the second step, the service goes through a process to determine where the user is geographically located by looking up their IP address in a GeoIP database. This step also includes parsing relevant information from the URL (Locate 602) as well as the user agent, referrer, or other related information passed in from the http header or URL. After the user is located, the service will then determine the most applicable URL for the user by identifying data in the requested URL. The service will look up details about the intended destination, whether it is to a specific item, or more general (e.g., this can include taking into account search items, category links, etc.). The service will then, using the data from the previous query, locate the best match for the user's geographic location (Translate 603). Once the end point is determined, the service will create a new URL for the storefront and item. If there is no perfect match for the intended item the system will allow the precision to decay until an appropriate match is made. The new URL takes into account the appropriate affiliate encoding (Encode 604). Finally, the user will be redirected to the appropriate affiliate network (Redirect User 605).

Referring to the various details of FIG. 5, the process 500 commences at step 501 when a user initiates a request by visiting an affiliate link from any Internet connected device, which can include but is not limited to laptops, desktops, smart phones, and tablet computers.

The service receives the request and performs a basic URL validation process at 502. The process includes ensuring the necessary information is included for the user to get to their destination as well as checking the general format of the link.

After the request has been received, the next step 503 is to resolve the user's Internet Protocol (IP) Address against a list of IP blocks and geographic regions in order to place the user within a geographical location. This is a common practice called "geo-location." If the system is unable to determine the country of origin, it will assume a default target country (e.g., US).

As an example, the block 503 may include parsing data from http header, such as user agent and referrer. As an example, the block 503 may include reading and parsing one or more cookies from a user's device.

The following step 504 determines the format of the incoming URL so that data can be gathered. The URL is matched against a list of supported formats. Once the format is determined the service is able to extract the data required. Based on this data the service is able to determine items such as Advertiser, Publisher, Source Country, Unique Item Identifier, Search String, and tracking data. As an example, tracking data can include one or more types of information such as, for example, device type, operating system, operating system version, etc.

At this point, the process 500 can split based on what data was identified in step 504, and the logic set for each link. If no user input logic has been set for that link, the data can either be for a specific item or can contain search criteria (see step 505). If the data contains search criteria then the process resumes at step 511. If the data identified is for a specific item at 505, the service will then query a data store specific to the Advertiser's storefront at step 506. If the data store returns information for the item specific query then the process moves to step 507. If no data is returned the process moves to step 510. When data is returned from the original data source, the service notes the item's relevant attributes as at 508. Those relevant attributes are then used to query the data source specific to the user's location at 509.

As an example, where a user has manual input override logic for a specific link to route traffic based off the tracking information gathered in FIG. 5, the redirection service may follow the rules set by the Publisher for the click. For example, if Publisher sets override for all devices of a specific type to a specific item in a different storefront than the original commerce link, the redirection service would follow the logic input and the click would be redirected to the item in the new storefront. The appropriate affiliate program parameters would be set and, this process would skip to 510 and continue on through the process in FIG. 5.

As an example, a process can include checking a clicker's metadata to see if it matches one or more overrides and, in turn, routes appropriately. In such an example, if no overrides are set or matched, a process may continue through to at least route correctly via geo-location and attach affiliate parameters after determining skimming, location, etc.

Depending on the quality and number of results returned the service may repeat the query with reduced precision by omitting certain relevant attributes at 510. This process will continue until an appropriate match is determined. The appropriate match may have the same or reduced precision as the requested item.

The next step 511 for the service is to use an algorithm to systematically determine which affiliate parameter to add to the link, during in the process of "skimming" (also known as "click sharing", "paying with clicks" or "click share"). Skimming is defined as the transparent process of rerouting a click with the Service Provider's affiliate code, instead of a Publisher's, for a pre-defined percentage of clicks. For example, if the effective skim rate was 15% then 15 out of 100 clicks would be redirected to use the Service Provider's affiliate tracking parameters instead of the Publisher's.

The determined beneficiary will have their specific affiliate tracking parameters attached to the final URL. If the Publisher is not active with an affiliate program for a specific online storefront but there is an active affiliate program then by default this link is affiliated with the service provider's parameter.

Once the end destination and beneficiary are determined, the service will, based on information associated with the original URL, formulate a new URL to get the user to the proper destination based off the steps above 512. The new URL will be encoded with the affiliate tracking information for the beneficiary, and will point to the result that was determined to be the best match from the original URL. If the destination online storefront does not have an affiliate program the link may not contain any tracking code.

After the URL has been reformulated (e.g., localized, translated, etc.) into the new link with the proper tracking and affiliate codes, the click information is then persisted into the Service Provider's database in step 513. The information regarding the geo-location, device type, operating system, date, time, and item they clicked on is queued up to be stored (e.g., persisted) into the Service Provider's database for tracking, reporting, and future skimming purposes (e.g., stored locally and then directed to a database for longer term storage). This information may be later used for the Publisher's benefit and determining traffic origin and for trend analysis purposes, reports, etc. This information may also be used later to determine information about the device or user associated with the click.

Once the click information has been queued for persistence into the Service Provider's database, the last step 514 in the process is to redirect the user using the new URL created. The entire process up through this point is transparent to the user. Finally, the user is redirected to the appropriately matched item in their geographic or device specific store, or into the default store if their location doesn't have a unique storefront. Such a process may take place, for example, where a user manually sets the destinations, but will run through specific rules that the user set before defaulting back to the original URL. For example, a user may set a rule that all IPAD® users will go into the ITUNES® storefront, and all OSX® OS users go into the app store storefront, but does not have a rule set for ANDROID® devices and/or ANDROID® OS types. If an ANDROID® device/OS user clicks on the link via the device, the redirection service will run through the rules to see if an ANDROID® parameter matches an IPAD® parameter or OSX® parameter and, as it may not, the process can default back to the original URL.

As described herein, translation of a URL can enhance user experience, optionally with decay to control user experience when a user tries to access an "incorrect" store. As to affiliates, a process may optionally handle an internal affiliate or an external affiliate. For example, the amazon.com Associates model may be referred to as an internal affiliate while the ITUNES® model may be referred to as an external affiliate, since it is managed by a third party (e.g., consider the Performance Horizon Group, PHG® entity). A process may optionally provide for skimming by a redirection service. For example, such skimming may be passive (e.g., where Publisher has no account in country) or active (e.g., changing affiliate tracking parameters from Publisher's to that of a redirection service).

As an example of a redirection process, consider a user in Germany browsing and wanting to buy a song as listed on a redirection service's client's website, that is based in the US (e.g., with a link to a US e-commerce store). In such an example, when the user clicks on the link, the redirection service collects metadata (e.g., user's locale, device and operating system type, and intended destination) and redirects the user (e.g., using API or other mechanism to do searches and lookups) to the most appropriate destination in a German e-commerce store.

A client (publisher) of a redirection service may be part of an affiliate program, which may provide a commission for directing sales to an Internet store (e.g., an ITUNES® US site where the client's website has an affiliate link to the ITUNES® US site). Where a client wants commissions on all purchases worldwide, that client may have to sign up with as many affiliate programs available in as many countries. The redirection service may allow the client to input all of the separate affiliate program details into the service, which will then save those details and apply them to each link appropriately, as determined by the metadata and other pertinent information for each click. As an alternative, a redirection service may allow that client to merely sign up with the redirection service where the redirection service manages affiliate programs in various regions. Accordingly, in such an example, when the client signs up for the redirection service, that client may be automatically provided use of all relevant affiliate programs simultaneously (e.g., via a single link per item on the client's site). In such an example, users (e.g. whomever clicks on the link) are redirected to appropriate Internet storefronts (e.g., ITUNES® stores) that may be country specific where the redirection service ensures proper affiliate tracking for its client.

As to skimming, a redirection service may practice passive skimming, for example, where the redirection service attaches its own affiliate parameters where its client is not a member of an affiliate program in a foreign country. Active skimming pertains to situations where the client of the redirection service is active with an affiliate program associated with destination store, but the affiliate tracking is switched to use the redirection service's account instead of the client's accounts. As an example, active skimming may happen for countries where translation is necessary (not for their base program/country/link) and active skimming may happen where passive skimming is not high enough to meet an agreed upon percentage between the redirection service and the client for use of the service (e.g., 15% or other percent).

Figure 7:
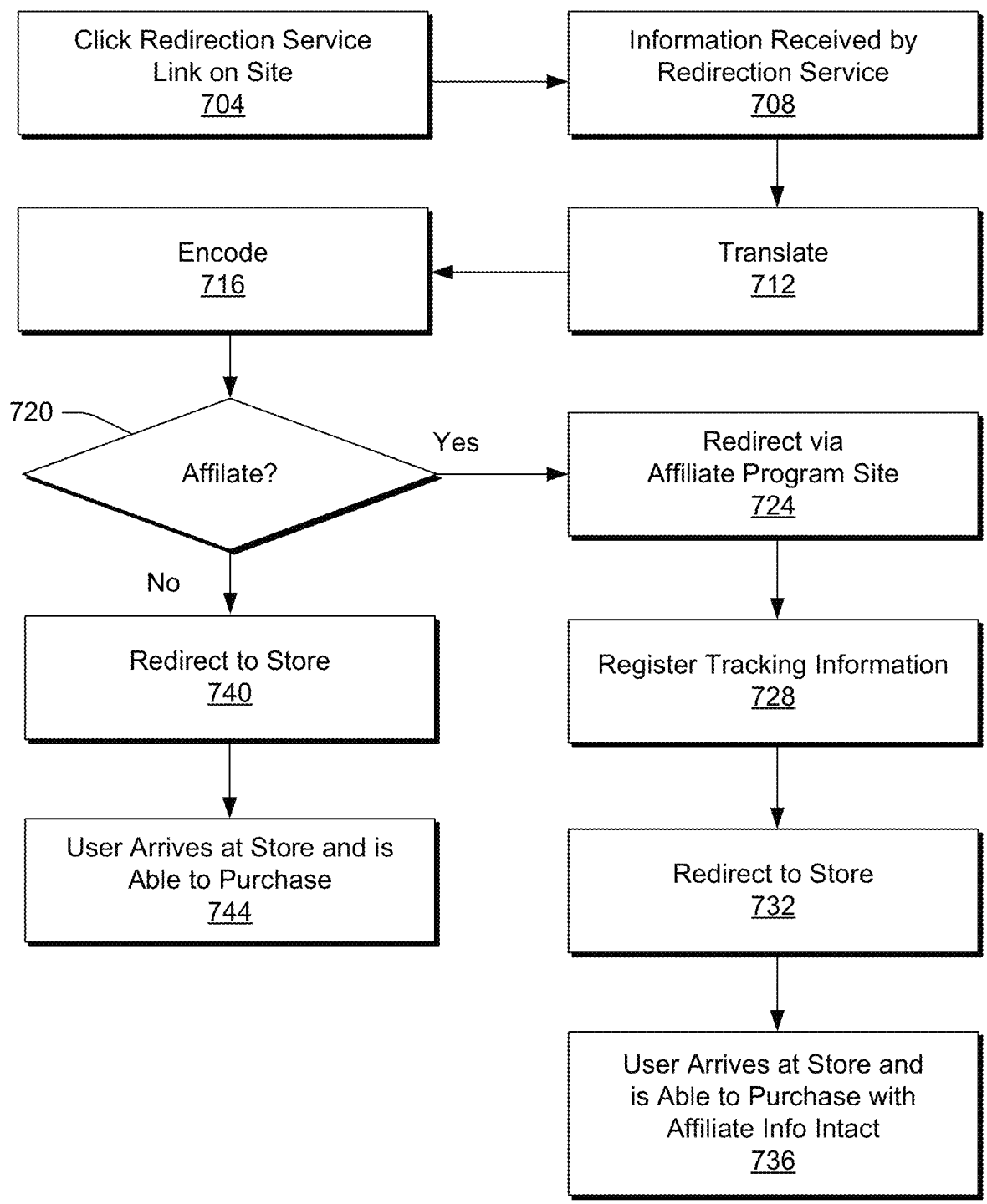
FIG. 7 is an example of a method for redirection.

FIG. 7 shows an example of a method 700. In a click block 704, a user clicks on a redirection service enabled link from an 1OS® app, website, blog, etc. In a reception block 708, the redirection service receives information transmitted in response to the click, where the redirection service determines the user's location and an Internet store associated with the link. In a translation block 712, the redirection service translates the link to a redirection URL that matches the Internet store for the user. In an encode block 716, the redirection service encodes the redirection URL with proper affiliate parameters, if appropriate, for the determined user's Internet store. In a decision block 720, a decision is made as to whether the site is a member of an affiliate program (e.g., is the site owner, as publisher of the site an "affiliate"). If the decision block 720 decides that the site is not an affiliate, then in a redirection block 740, the redirection service redirects the user via the redirection URL to the Internet store. As indicated, in an arrival block 744, the user arrives at the Internet store and is able to purchase an item associated with the redirection enabled link that appeared on the 1OS® app, website, blog, etc.

If the decision block 720 decides that the redirection service enabled link indicates that the publisher of the site is an affiliate of an affiliate program, in a redirection block 724, the redirection service redirects the user via an affiliate program site using a redirection URL that includes affiliate information. In a registration block 728, the affiliate program site registers tracking information. In a redirection block 732, the affiliate program site redirects the user to the Internet store using an appropriate URL. In an arrival block 736, the user arrives at the Internet store and is able to purchase an item associated with the redirection enabled link that appeared on the 1OS® app, website, blog, etc., where the affiliate information is intact.

In the example of FIG. 7, in the process of an affiliate network redirect, the click may be recorded and a cookie placed. For example, in block 732, the user may be redirected to the ITUNES® preview page where the affiliate cookie is placed and in block 736, the user is then redirected onto the relevant landing page inside the store. In such an approach, because the user was directed to the correct store with the proper affiliate tracking the user is able to buy the product they were initially interested in purchasing and the publisher of the site will receive any resulting commissions. As indicated by blocks 740 and 744, if the user clicks on a link for an ITUNES® item and it is determined that the user is coming from a country where there is no affiliate program, that user may be redirected to the proper ITUNES® store (e.g., according to the translation block 712, which can translate a link for one country store to a different country store based on country of a user). Accordingly, the user will be able to purchase her desired item but no commission will be generated because there is no supporting affiliate program for that store.

While the example of FIG. 7 is shown as including a redirection service and an affiliate program site, a redirection service may optionally be included as a service of an affiliate program site. In such an example, where the redirection service of the block 708 is a service of the affiliate program site, the block 716 may continue directly to the block 728. In the example of FIG. 7, a determination process may optionally be implemented to determine a beneficiary (e.g., one or more parties that should or may benefit from traffic, a redirect, a purchase, etc.).

As described herein, a redirection service can provide a link "proxy" service that allows for multiple geographically-segmented affiliate programs to be used simultaneously. The service can send a click on an affiliate link first to the redirection service where the service targets based off geography, device, operating system, or other factors of the click, translates the link to work best for the user's specific store and then affiliate encode the link appropriately.

As an example, a redirection service may proceed via three steps to ensure that the final URL is best matched for a user and her regional Internet store. Such an approach can ensure each click is correctly routed to its most appropriate end destination.

As an example, a redirection service may use geo targeting, which is a practice of delivering content that is specific to a user's location, device targeting as a process for delivering content specific to a user's device, operating system targeting as a process for delivering content that is specific to a user's operating system, or one or more other factors that may determine the best storefront for a user. The redirection service may implement a process (e.g., IP address resolution, user agent parsing, metadata queries, or other) that identifies where the user is clicking from and what the device information is in order to determine which Internet store is the best match for that user.

A redirection service may use one or more rules and logic to quickly translate a link's intended destination into a link appropriate for any user and device. A redirection service may, after a link is translated, encode it with the appropriate affiliate parameters to match the standards for the relevant affiliate network, if one exists. Such a process can also provide for exchange of user level tracking parameters, for example, for seamless internal tracking.

For situations where an affiliate network allows for "user level tracking", a redirection service may pass those parameters back and forth between an affiliate network and a redirection service may optionally record such parameters (e.g., for purposes of learning, reporting, commerce, etc.).

It may be assumed throughout this description that each location, user, client, affiliate, etc., has appropriate hardware and software to perform various actions. Known terminals, processors, routers, switches, modems, servers, connecting links, communication methods, ISPs and/or output devices/interfaces may be used, as appropriate.

FIG. 8 shows an example of a system 800 as including one or more processors 810, memory 820, one or more interfaces 830, one or more blocks 840 and other circuitry 850 and an example of a method 870 that includes various data structures 882 and 884. The system 800 may be a server configured to run one or more services to serve needs of users of other computing devices, systems, etc., on a network. As an example, the system 800 may include circuitry configured to perform one or more actions described herein. Circuitry may be in the form of hardware, software, etc. In the example of FIG. 8, the processor(s) 810 can access the memory 820, which may store instructions provided in the form of one or more blocks 840. A block may be a computer-readable medium (e.g., that is not a carrier wave) that includes processor executable instructions that instruct the system 800 to perform various actions. In various figures, blocks (e.g., or modules) are presented with respect to processes, methods, etc. Such blocks (e.g., or modules) may be in the form of one or more computer-readable media. Such computer-readable media may be "non-transitory", in other words, physical media (e.g., memory, optical disk, etc.) as opposed to a transitory medium such as space, which may carry transitory signals.

As to the one or more interfaces 830, the system 800 may include one or more network interfaces configured for communication with the Internet, either directly or indirectly. As to the other circuitry 850, it may include wireless circuitry configured for communication via one or more wireless networks, optionally including one or more "cellular" networks (e.g., 3G, 4G, etc.). The system 800 may optionally be configured as a single device or as a collection of devices.

In the method 870, an application 872 is configured to communicate directly or indirectly via the Internet (e.g., a web browser or other application). In the example of FIG. 8, communication is shown as occurring via HTTP, noting that other types of communication may be used. The system 800 acts to direct the application 872 to an appropriate location 874 (e.g., the "best" location). As shown, the system 800 includes features to act on receipt of a URL 882 and to formulate a redirect URL 884. As described in various examples, the redirect URL 884 may be a "best location" URL, for example, based on logical operations performed by the system 800, which may include one or more operations that rely on resources external to the system 800.

The URL 884 may be formulated according to a data structure. Such data structures may be considered as having data fields, for example, as appended or concatenated to form a URL (e.g., according to standard characters such as "&", etc.). Data fields may be specific to one or more parties and may provide for one or more functions (e.g., item-related, commission-related, etc.). Such a data structure may exist at one or more locations stored in a memory (e.g., physical memory of a server, a client, etc.). Such a data structure may be formed using a process (e.g., a product formed by a process). For example, a data field or data fields may correspond to "best location" information determined by a decay process. Information included in one or more fields of the data structure may be or act as instructions to instruct an application (e.g., a browser application, a server application, etc.) to perform one or more actions (e.g., access information, transmit information, package information, etc.). As an example, information may optionally be structured according to an API call that causes a machine to perform one or more operations and optionally return information.

As an example, the system 800 may include a URL parser block for parsing a received URL (e.g., URL 882) to provide information to a logic block for formulating a new URL (e.g., URL 884). A received URL may optionally include special metadata dictated by a redirection service (e.g., a service ID, etc.) that may instruct the system 800 to use certain parser features, logic, etc. More generally, a received URL may include information such as one or more of an application ID, a client ID, a user ID, a store (e.g., an ITUNES® store, an AMAZON® store, etc.) or a country a link is associated with (US, DE, etc.). The system 800 may respond to receipt of such information and formulate a new URL for redirection to an appropriate location (e.g., as determined by a process performed at least in part by the system 800).

As an example, a click share method may include so-called skimming or a passive share. A user may be someone clicking on a link on a website, which is routed to a service for processing. A client of the service may have a defined rate (e.g., 15%) where, if above or below the rate, credit may be determined accordingly.

As an example, such a method may include acting on where a user is coming from and where they are being sent to (e.g., advertising, etc.). A user attribute may be device, where from, etc. As to where from as an attribute, this may specify country (e.g., region, etc.). If a client supports the user, based on attribute, then credit may be determined accordingly. As an example, for an ad service, if from a device such as IPAD® device, an ANDROID® device, a PC device, a MAC® device, etc., the routing may be completed based on a device attribute (e.g., device type attribute, OS type attribute, etc.).

As an example, a link may be built on a US ITUNES® link, then this may be an attribute (e.g., a US request attribute); whereas, for example, for a Canadian link, it may be a CA request attribute. As an example, an affiliate program may be a factor (e.g., an attribute) in a method. As an example, attributes may include device, country, affiliate, etc.

As an example, information surrounding all details of the click, including device, click date/time, metadata and HTTP header, destination information, etc. may be collected, aggregated, etc. and stored within the redirection service. Such information may be recalled at any point by the service provider through the use of internal tools for any intended purpose. For example, information on device (e.g., device attribute, OS attribute, etc.) and purchases of goods or services may be of value to one or more parties (e.g., client, affiliate, advertiser, device maker, etc.). Information about use of a link may be aggregated, click stream information may be aggregated, etc. Such aggregated information may be of value to one or more parties. As an example, opportunities exist for "buy in" or participation in the click stream. For example, a party may enter a click stream for one or more purposes, whether known or knowable to a user or not. For example, a party may enter a click stream based on one or more attributes (e.g., location, device, OS, song, number of purchases made in specific time period, number of clicks made in specific time period, and other factors, or aspects derived from these factors, around clicks, purchases, and timeframes that may be useful to understand purchase behavior).

Additional data information can be derived, such as the relative conversion rate of clicks to sales for a specific item. This is done with the information persisted about the device in FIG. 5, the click, the link, and sales and commission related information gathered from the Affiliate Networks through their APIs or dashboards. The redirection service provider can determine the likelihood that a user purchased the item that they were originally sent to the store for from the Publisher, purchased something else instead, or purchased nothing at all through an algorithm created by the redirection service. This information can then be shown to the Publishers within the redirection service's "dashboard" or other places as required.

As an example, a process to gather and aggregate that information starts when a user clicks on a link to the redirection service for the first time. The same process unfolds as explained in FIG. 5, where the user's geo-location, device type, operating system, original item they are looking for, and time of click is persisted, the URL rebuilt, then redirected to the appropriate destination. However, during the rebuilding step, a globally unique "Campaign-ID" parameter is attached to the destination URL in order to uniquely identify the specific click (which can be mapped back to understand the related device's attributes and link).

If a user purchases anything after clicking the referral link, that information is stored in the storefront's affiliate program, and can then be reported to the redirection service through the affiliate program's APIs or dashboard.

As an example, for a sale returned with a globally unique Campaign-ID the information relating to the subsequent click and the URL clicked can be referenced.

As an example, a Publisher publishes a link for his new game app in APPLE® IOS® app store on his company's FACEBOOK® page. A user clicks on the link to the redirection service, which determines the user is using an IOS® device from Germany that registered a click at a time (e.g., 10:00 AM UTC). In such an example, the redirection service may then dynamically rebuild the link to the game, for example, with a globally unique Campaign ID, for the German ITUNES® storefront after adding a tracking cookie to the device and the appropriate affiliate parameters to the destination URL. In this example, when the user then purchases the game, and because the affiliate ID was set, the purchase is credited to the Publisher. After the Advertiser publishes the relevant sales information to the affiliate network the Publisher's data is imported into the redirection service via the affiliate network's APIs and persisted to the redirection service's database. Information persisted includes the purchase date and time, price, type of item purchased, how many purchases were made, and other relevant purchase data, then looks for the Campaign ID that was passed through and calculates the probability the item purchased was the same item that the user was sent to the store for using the redirection services algorithms (e.g., consider an implementation as a relative conversion tracking process).

Such a process may be repeated for individual sales made from clicks that were routed using the redirection service and attributed back to the Publisher, for example, based off the affiliate information added during the click and redirection process. As an example, relative conversion tracking process scores may be attributed to a user's device via the unique identifier. As an example, such a process may be used to determine users who are eligible for "re-targeting." Re-targeting can refer to a process of noting if a user has, or has not previously purchased an item based off the algorithms and information gathered above, then using that information to take further action. For example, if a click from a unique device has bought an album after being directed, that unique device could then be targeted with "re-targeting" for future albums by the same artist. Or, if it had been determined that the click from the device did not result in a sale that device could be targeted with "re-targeting" when the album had a discounted price.

As an example, where a client submits a create link request to a service for providing an "evergreen" link (e.g., a link that can include assurances that it can direct to at least one desirable site), the service may use information provided by the client (e.g., a link or other information) to access metadata, to construct "short" code (e.g., via short URI generator) that is associated with at least a portion of the accessed metadata and return an evergreen link to the client (e.g., short URI, etc.). As an example, a URI may be classified as a locator (URL), as a name (URN), or as both. As an example, TinyURL/Bit.ly is a URL shortening service (e.g., a short code generator) that can provide short aliases for redirection of long URLs (e.g., where for each URL entered, a server can add a new alias in a hashed database and returns a short URL). For example, a client may have a long link from a merchant (e.g., AMAZON® merchant, ITUNES® merchant, etc.) and desire to be able to allow users to access a product form that merchant where that merchant may change its long link. In such an example, the service may be an intermediary, as it may provide a link tied to metadata (e.g., which may be short link). Upon a user clicking the link (e.g., as provided by the client), the service may direct the click to the original long link.

As an example, a database may include a merchant link for a good or service, metadata for that good or service and a generated link. In such an example, where a user clicks on the generated link, if the merchant link is inoperable, a method may access the metadata and then direct the user to the merchant, for example, specifically to the good or service; alternatively, a method may access the metadata and then direct the user to another merchant or another resource. As an example, an evergreen process may be part of another process, method, etc., for example, for geo-location, assessing splits, assessing credits, etc.

As an example, consider a playlist that includes a plurality of links associated with a merchant. Where the playlist is, for example, for classical music, 50s jazz, 60s rock-n-roll, etc., and expected to be "fixed", a change in one or more of the links may confound the playlist, advertising of the playlist, "liner" notes, history, etc. If the playlist is to create a "mood", one or more inoperable links may lead to one or more missing songs that may characterize that mood. For example, consider a Bossa Nova playlist where a link to the song "the Girl from Ipanema" is inoperable, the playlist is no longer complete, and the experience is diminished. As an example, an evergreen process may provide generated links that can help ensure that a playlist maintains its integrity. Further, as an example, a tiered approach may be implemented to substitute a song where the original song of the playlist is no longer available (e.g., or available under different terms, unfavorable terms, etc.).

As mentioned, e-tailers can operate localized storefronts for various countries and issues may arise, for example, where each country storefront may have distinct product IDs for various items in a library, catalog, etc. As mentioned, a particular issue may be geo-fragmentation. As mentioned, as an example, an engine may translate a link to ensure it references an appropriate item ID (e.g., in a storefront) that can enable someone to complete a transaction (e.g., buy a digital product, a physical product, etc.).

As mentioned, as an example, a service may allow visitors that click a link (e.g., on a website, in a social post, through an app, an ad, etc.) to be sent to the right product in the right store, rather than an error message.

FIG. 9 shows an example of a scheme 910, examples of implementations 920, example service criteria 930 and example information 940. As an example, information may be gathered via information passed to or otherwise accessible to a redirection service. As an example, information may be device or other information. A device may be determined on the basis of hardware, software, firmware, etc. For example, a device may be an APPLE® device executing an 10S® OS with a particular version. As an example, a user of such a device may execute an application within an OS environment established by the device using the 10S® OS. Such an application may be a game, consume media, etc. As an example, an application may include features for downloading, purchasing, cloud storage, etc. of one or more files, licenses for use of files, etc.

As an example, a redirection service, as a service provider, may aggregate information and assign a unique identifier to each user or user's device, for example, by noting the IP address and other relevant and partially and/or uniquely identifying information. Such information may be saved in a database and, for example, a unique identifier to reference it may be passed along as a "cookie" on the device to track future clicks on the redirection service provider's link again.

As an example, a client may supply unique identifier information (e.g., such as an 10S® OS device's ID for advertising "IDFA", or advertising identifier) as a parameter in a redirected link. As an example, a redirection service may employ one or more other third party technologies, for example, to "finger print" a device, etc.

As more clicks and purchases are made, a more detailed profile about user purchasing and clicking habits can develop, for example, based around purchasing behavior such as time of day or week purchases were generally made, genres and media types of purchases made, how often they purchased, conversion rates, etc.

As an example, a user may click on a link where that link is associated with a redirection service. The redirection service may be in a position to gather information, for example, where the user is located (e.g., the user's country), what device the user is using and its OS and optionally one or more applications executing in an OS environment. As an example, consider a browser application or other application that includes a browser module. As an example, a redirection service may be configured to redirect a user to a storefront, a particular item in a store, etc. As an example, an application may consume an item in a store (e.g., a digital item, which may be media, an application, etc.). In such an example, the application may be local or remote. For example, consider a remote web service (e.g., software as a service "SaaS") that stores a user's digital media and that includes a media player, etc. Or, for example, consider local storage, which may be accessed via one or more media players (e.g., consider a network data storage in a home that can serve media to various network destinations of privileged users that can access the network data storage). As an example, a device may be a television, a mobile device, a computer, etc.

As a redirection service may be in a "chain" of actions, such a redirection service may act to introduce or direct media such as advertising media along the chain of actions, for example, at one or more links. As an example, the redirection service may redirect a user to a storefront where a particular advertisement is loaded for viewing by the user on the user's device (e.g., via a browser interface). As an example, where a user downloads media, the redirection service may provide information for tagging advertising material to the media. For example, where a movie may be a free movie, the movie file may be interspersed with advertising media, links to advertising media, etc. Such injection of material may occur via injection of information into a link, routing a chain, etc.

As an example, a redirection service may be positioned in a chain in a manner that can facilitate gathering information and/or distributing information. Distributed information may include link or data structures that cause information to be associated with consumption of an item, purchasing of an item, expiration of an item, etc.

FIG. 9 shows some examples of information (see, e.g., the information 940) that may be involved in a redirection service process. As an example, a client of the redirection service may desire customized processes based on one or more types of information, for example, for one or more purposes (e.g., serving ads, tracking, etc.).

As an example, a user of a device may be unaware of, not remember, etc. particulars of the device. For example, a user may not know the type of operating system that the device implements to execute applications. As another example, a user may not know what digital media formats are acceptable for rendering via audio circuitry, video circuitry, etc. of the device. As shown in FIG. 9, information can include device information such as device type, OS type (e.g., and version), etc. As an example, a redirection service may receive a request that originates from a device agnostic link and that is accompanied by information that can be used by the redirection service to redirect using a link that may be device specific, for example, based at least in part on the information that accompanied the request originated from the device agnostic link. Such information may be, for example, an identifier of a user, an identifier of a device, etc. Where information includes an identifier of a user, that information may be used to access stored information (e.g., profile information) that may include device information that is associated with the identifier of the user. Such an approach may be an indirect process to determine one or more device related parameters (e.g., device type, OS type, media player type, amount of memory, etc.). Where information may explicitly determine a device type, OS type, etc., such an approach may be considered to be direct (e.g., part of a direct process).

As an example, a user may construct a profile and/or add information to a profile. In such an example, a profile may be stored along with an identifier. As an example, the identifier may be accessible by a website that includes a master link such that upon activation of the master link, the identifier is transmitted along with a request to a redirection service. In turn, the redirection service may access a profile associated with the identifier for purposes of selecting and/or building an appropriate redirection link (e.g., URL, etc.). As an example, a redirection service may include a tool for a user to register a profile where such a profile may include information suitable for use in making redirection decisions that can direct that user (e.g., and optionally one or more other users) to an appropriate destination upon that user using a device to actuate a master link that transmits a request to the redirection service (e.g., a server of the redirection service).

As an example, a master link may be transmitted from a redirection service to a client or customer for use (e.g., on a webpage, in an application, in an advertisement, etc.). In such an example, a click on the master link may transmit a request to the redirection service (e.g., to a server via the Internet). Upon receipt of the transmitted request, which can include additional information (e.g., about a device that initiated the request or "clicked" the master link), the redirection service can select a redirection link. As an example, a master link may be agnostic as to one or more factors (e.g., device type, OS type, etc.) and a selected redirection link may be specific to one or more factors (e.g., device type, OS type, etc.). As an example, a redirection link may optionally be geographically resolved, include affiliate information, etc.

As an example, a master link may transmit a code that can be received by and used by a redirection service as part of a process to select an appropriate redirection link (e.g., and/or to build a redirection, etc.). As an example, a master link, once clicked, a request can be received by a redirection service with additional information where the redirection service may use at least a portion of such information to select an appropriate one of a plurality of links associated with the master link. As an example, a master link can include its "own" information where additional information can be transmitted with a request upon clicking of the master link (e.g., device information, OS information, etc.).

Figure 10:
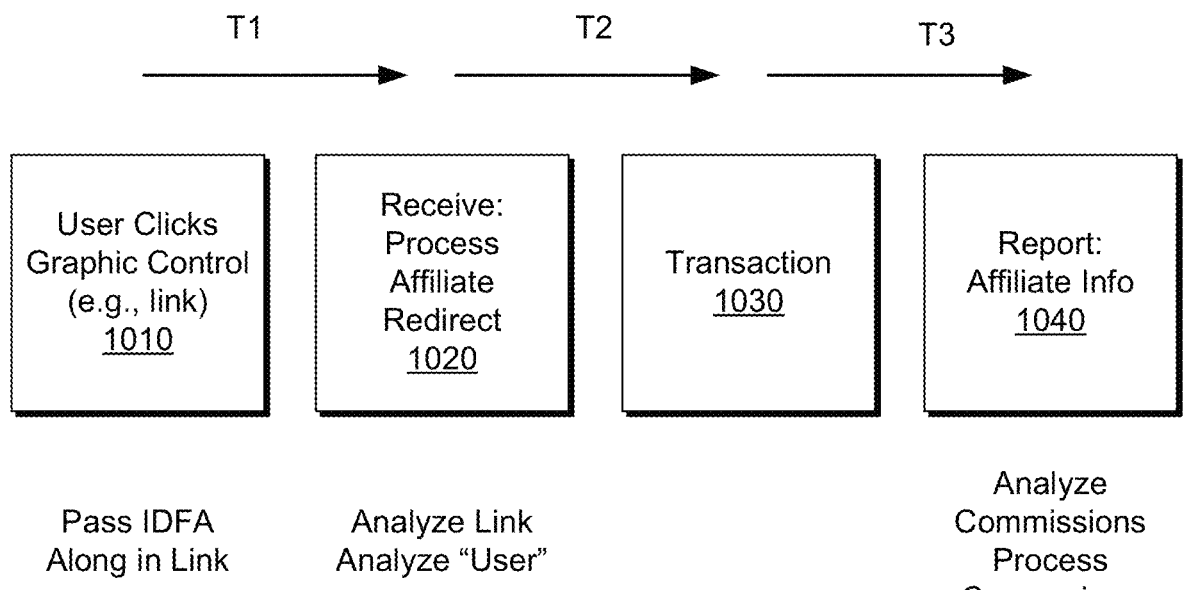
FIG. 10 shows an example of a method.

FIG. 10 shows an example of a method 1000. In the example of FIG. 10, in a click block 1010 a user clicks an ad (e.g., as a remote event); in a reception block 1020, the click (e.g., click information) is received, processed, affiliated and redirected (e.g., at least in part by a redirection service), a sale is made (e.g., for an item or license, etc.); in a transaction block 1030 a transaction occurs (e.g., as a remote event); and in a report block 1040 a report is generated that includes information as to an affiliate. In such a process, commissions or other perks associated with the sale may be attributed, distributed, etc.

As an example, where a user clicks an ad, the click (e.g., selection) may cause an ID to be transmitted to a redirection service (e.g., an ID may be passed as information in a link to a server via a network). As an example, a link may include an ID for advertising (IDFA) (e.g., an advertising identifier). As an example, a redirection service may receive information responsive to a user clicking an ad on a device, for example, where the click is processed, affiliated and redirected. As an example, a sale may be made, for example, based in part on the ad (e.g., the IDFA). In such an example, affiliated information may be reported (e.g., for analyzing commissions, process conversions, etc.). As an example, time scales may be associated with various actions. For example, a time scale of about a tenth of a second may be associated with a click and transmission of information such as an IDFA (e.g., embedded in a link, etc.). As an example, a sale may be processed within a time frame of about one day where commissions, etc. associated with such a sale may be processed on the order of several days.

Figure 11:
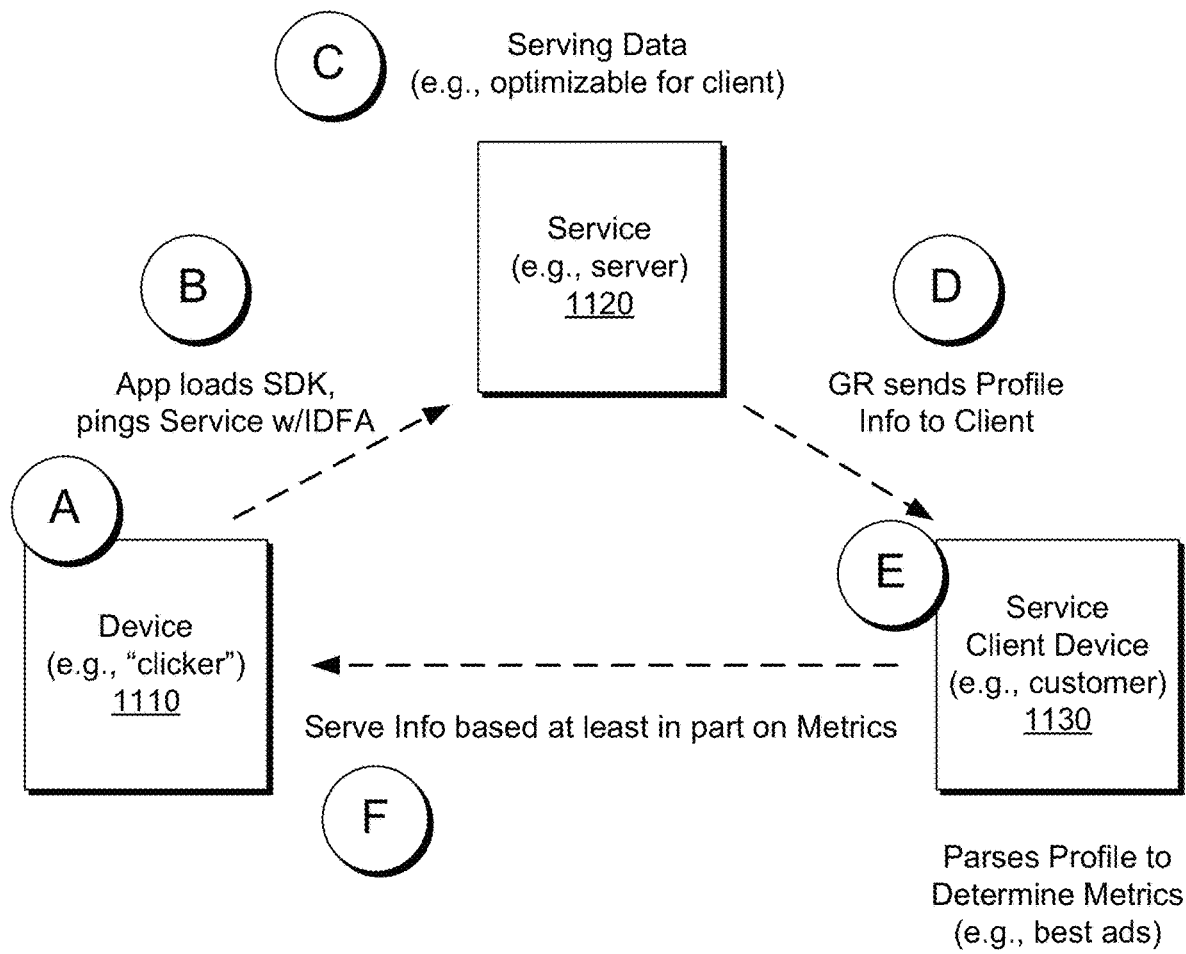
FIG. 11 shows an example of a system.

FIG. 11 shows an example of a system 1100 that includes various actions A to F. In the example of FIG. 11, the system 1100 includes a device 1110 (e.g., a user device such as a tablet, a cell phone, a smartphone, a notebook, a smart watch, etc.; also referred to as a "clicker"), a redirection service 1120 (e.g., GEORIOT® service as an example of a redirection service) and a service client device 1130 (e.g., a client or customer of the redirection service that may request use of one or more services of the redirection service).

As shown, a user may operate the device 1110 (A), an application may load on the device using an SDK or other features where the application is used to transmit a signal to the redirection service 1120 (B). As an example, the redirection service 1120 may serve data (C) that may be optimized for the client 1130, for example, based at least in part on information ascertained via the transmitted signal to the redirection service 1120 and, for example, using one or more databases (e.g., geo-location, user profile, etc.). As an example, the redirection service 1120 may compile a "profile" for the user, the device, the application, etc. (e.g., a profile may be centric or polycentric to one or more criteria) and transmit the profile (e.g., or profiles) to the client 1130 (D). As an example, the client 1130 may parse the profile or profiles to determine metrics that may be associated with advertising or other information that may be directed to or otherwise used in making decision with respect to a user, a group, etc. In the example of FIG. 11, the decision may be to direct one or more ads to the user of the device 1110. As shown, the client 1130 may, directly or indirectly, serve information to the device 1110 (e.g., the user, etc.) based at least in part on one or more metrics.

FIG. 12 shows an example of information 1200, for example, organized as a table, a data structure, a database, etc. As an example, information may be organized by categories. As an example, an ID for media that may be advertising media may be referred to as an ID for advertising (IDFA) (e.g., an advertising identifier). As an example, information may be available from one or more sources.

As an example, a redirection service may be configured for receipt of an IDFA, for example, along with information upon which the redirection service may construct a redirection link (e.g., perform a redirection service). As an example, a device may execute an OS and an application that loads into an OS environment. In such an example, the device may cause information to be transmitted to a redirection service, for example, optionally along with an IDFA. In turn, the redirection service may transmit a profile to a client of the redirection service. In such an example, the client may parse the profile, for example, to determine a best ad or ads. In such an example, the client may serve a best ad or ads to the device (e.g., of the user, of "like" users, etc.).

As an example, a redirection service may gather data on a daily basis. Such information may include the information around clicks on links that are translated/affiliated as well as subsequent sales and commission data that come from successful referrals.

As an example, a redirection service may include a profiling service that can dissect such data (and optionally grab additional data), for example, to aggregate it on a per device basis (e.g., per user or other basis) and then provide the information to redirection service clients, mobile ad networks, etc. These ad networks may use the information to target their ads to match the preferences of the user who previously clicked. As an example, a service may receive and store information as to form factor of a device, for example, consider mobile, desktop, etc. As an example, a form factor and/or other information may be associated (e.g., mobile/app, desktop/music, etc.).

Example of Gathering Data to Form a Profile

1. Client (ad network) uses a redirection service link for ads that include outbound commerce links (e.g., to an ITUNES® store, an APPLE® app store or an AMAZON® store). These links might include a common identifier for the device it is coming from that the client would add to the link (like the ID for advertisers in an IOS® OS).

2. When user clicks on the redirection service's link behind an ad several processes take place.
  a. The redirection service notes the header information (which is also to do the redirect) and saves it to the service's database.
  b. The redirection service analyzes the link's information and attached parameters (also necessary for the any necessary translation of the link) and saves it.
  c. The redirection service may then also attach a unique "campaign ID" into the destination link (e.g., a Commerce link is a value that is later reported back via the affiliate network and is associated with the clicks/sales/commissions for that "campaign.")
  d. The redirection service may also look for a cookie on the user's device, then optionally set one if none are found. This allows the redirection service to still create meaningful data without necessarily needing the client to send through a unique identifier as a parameter in the redirection service link.
  e. The user is forwarded along to the appropriate item in the appropriate storefront based on the redirection service's rules.
  f. The redirection service rebuilds the destination URL based off the information attained above (same process described previously), adding the additional campaign ID and/or setting a cookie. The user is then sent to the destination URL.

3. The redirection service then parses all of the information it gathered in the previous steps to pull out what the redirection service determines is important information, then saves it in a database or data store under the unique keys of any unique IDs that were passed and/or the cookie the redirection service read/wrote.

4. The redirection service stores the metadata around the client sending through a click (e.g., which also includes other things redirection service may save/increment)

5. After enough time has passed for any subsequent sales/commissions to come through, the affiliate network comes back with sales/commissions associated with that unique campaign ID which was added in step 2. C. i. defined above.
  a. The redirection service then parses this data.
    i. The redirection service searches for a "conversion" on the original item (e.g., did the item in the original link "match" one of the items that was purchased).
    ii The redirection service may also search for other activity (affinity towards purchases of other media types, the number of purchases, the time span between purchases, etc.)
  b. The redirection service saves this info back to the profile, which is defined by a device's unique identifiers and/or cookie(s).
  c. The redirection service also gathers data on frequency of these actions (e.g how many times the link was clicked vs. the number of sales, sales made after the click, etc.).

Example Serving Profiles

1. When an app (or web page) loads it uses the advertiser's SDK/JavaScript to ping one or many ad networks, as well as ping the redirection service.
  a. When it pings the redirection service, it can see if a visitor to their app or site has ever clicked on one of the redirection service's links before (due to redirection service cookie or by sending the redirection service a unique identifier). The redirection service can then determine if the redirection service has any a history of the device's behaviors (e.g. their profile).
  b. If this is an IOS® device and the client has an SDK embedded, it's possible that the client could also pass the redirection service back a list of the apps that are currently open on the user's device. The redirection service could then add this info back into profile, which would allow the client to perform specific actions based off the app listing. As an example, a method or methods may be applied to ANDROID® devices, WINDOWS® devices, KINDLE® devices, or other devices, and for other media types on the device, such as music, books, movies, etc.

2. The redirection service may then query one or more databases for this cookie and/or unique identifier, and if found, grab the profile that has been compiled for that ID.

This profile can then be offered to the requestor and further action can be taken based off of the information therein.

a. If the redirection service does not have a profile for this person/device/etc. The redirection service can then use the aggregate data (such as the specific region, device type, time of day which is derived from the ping) and the any other relevant data the redirection service may have available to create a non-specific profile.

3. The ad network could then takes the redirection service profile data and may use its own proprietary logic to determine the next step to take within their system(s).

a. If the redirection service has a robust profile for an individual device, the ad network could use that data to decide on which ad(s) to display to the user. If the profile data is not robust, the ad network could ignore it and default to their existing logic.

4. The redirection service may increment its profile to show that the cookie/unique identifier had been pinged.

a. This allows the redirection service the level of "conversion" from ping to click (compared to the click to sale conversion), comparable to an "impression".

5. The redirection service may mark that the client has pinged the redirection service for a specific profile and the "quality" of the profile that the redirection service just served.

As an example, a redirection service may provide a service that builds off its data from two layers of activity (loading a page/app through clicking an outbound commerce link, and clicking that outbound commerce link through purchases from that retailer).

The redirection service may use affiliate sales data, currently provided by the affiliate program to improve internal processes. As an example, for affiliate programs like ITUNES®, reports don't include the actual item sold but rather reports are at a "category" level. In this case the redirection service may develop rules/statistical models to determine if a click resulted in a purchase of the promoted item.

As an example, the redirection service may combine data from multiple retailers into a single profile. As an example, the redirection service may combine click data from multiple ad networks whom operators have an agreement with the redirection service to provide such data into a more robust profile per unique ID. As an example, a redirection service may work with entities like VigLink (San Francisco, Calif.) or Skim links (San Francisco, Calif.) to perform one or more data gathering processes for the redirection service (e.g., allied service providers) to build profiles around a user's behavior across multiple online storefronts.

As an example, a redirection service may not serve an ad; rather aggregate the data into these "profiles" where profiles are passed along and where it is up to those recipients (e.g., redirection service clients) to determine how to best use that data to better serve their ads (e.g., via their algorithms). As an example, a redirection service may be positioned (e.g., within a chain) to collect a set of attributes, for example, derived/tracked in a manner allied to one or more redirection services.

As an example, a redirection service may optionally work with Real Time Ad Exchanges and Re-Targeting networks (e.g., "bounty" on users, etc.). As an example, a redirection service may alert an ad network (mobile or otherwise) that is serving the ad of the possibility of serving an ad with a higher payout instead of anything they might have in their current inventory. For example, if traffic is high for a particular item noted by a redirection service, traffic and associated info may be a basis for one or more profiles that may be of interest to an ad exchange.

As an example, a redirection service may include one or more layers as to socio-economic/psychographic/demographic information, for example, tied in by region or other common attributes that redirection service may have stored.

Some example methods for getting/using profile data for a given user/device and other techniques are described below.

Example

1. Application launches.
2. Client SDK (or app code) is loaded.
3. Client SDK queries the redirection service for profile data for the device. The following takes place during the request:
   a. Server looks for presence of a cookie to identify the device.
   b. Optionally: SDK provides server with unique device identifier (e.g., IDFA on 10S® devices, advertising identifier, etc.).
   c. Optionally: SDK provides additional information to aid in building the profile.

Example for Running Application

1. Running Applications (e.g., application processes are currently running on the device)
2. Application information
   a. In-application history
      i. Time/frequency of use
      ii. Last time application was launched
      iii. In-app purchase history
      iv. Application download date and time
   b. Other application information (e.g., version, etc.)
3. Optionally other info/exchange
   a. Response
      i. Service sets cookie as part of the response, so future requests can be correlated (e.g., if no cookie option; else possible update to cookie, optionally w/a timestamp).
      ii. Service returns profile for the user
   3. Optionally different levels of profile data
      a. Full profile
      b. Custom profile (e.g., based on particular data)
      c. Other options
         i. Demographic data
         ii. Recommended items to advertise based on top charts/trending items and history
         iii. Other
   d. Optionally scan for "retargeting" providers/networks, for example, to serve a specific ad to a particular user or users (e.g., metric based). Optional building profiles for user based off of IP (e.g., to get a specific geo-location)/user agent/time of day/etc.
4. Client uses the data to make a decision using their own internal tools and resources based off data provided.

As an example, a redirection service may provide an optional scale or metric for discrimination as to how likely the user will be purchase.

Example

1. A process may occur at a time after an application has loaded to refresh the profile:
   a. IOS® apps rarely close, run on application launch.
   b. Run on "opening" or "resuming" an already running app.
   c. Run on "focus", as an app gains focus by user entry of command/selection.

Example

1. See one or more other example, however:
   a. Client SDK calls Client server (e.g., for an existing reason, or for the specific purpose of getting redirection service profile).
   b. Client server receives call and then queries the redirection service.
   c. Client server receives response from redirection service and returns response to the app.

Example

1. See one or more other examples, however, as part of an existing call:
   a. SDK is syncing to client server at some point to get some other necessary information. Server makes call to the redirection service (either sometime before, or as a blocking step of processing the SDK request) and returns the requested info from the redirection service along with other requested information to the client app.

Example

1. Via another method of calling from the client app (e.g. during app start, specified timeframe in the app, etc.).
2. Client SDK calls Client server to trigger an advertising decision process based on information provided from redirection service profile.
   a. Information required from app/device is passed to Client via SDK
3. Client server receives call, then queries the redirection service based off information received.
   a. Information may be forwarded to the redirection service from client app.
   b. Information may be forwarded to the redirection service that the client server already documented.
      i. Advertising identifier (e.g., ID for advertising) is tied to client's system level unique ID that could have occurred previously (on first app launch for example).
4. Client server receives response from the redirection service and uses internal processes to make decisions based off information received.
   a. Client may conceal use of the redirection service to provide user with minimally invasive experience, but still make a decisions on the server side to return a specific ad or ads to the user.

Example

1. As part of an existing call:
   a. SDK is already syncing with client server at predetermined timeframe. Server makes call to the redirection service (either sometime before, or as a blocking step of processing the SDK request) and then uses the information from the redirection service to trigger an internal process based off information received.

Example

Data are retrieved from the client server, may operate with a client server(s)/system cache of a redirection service result, for example, rather than repopulating a profile from the redirection service every time.

As an example, client builds a mobile game that queries redirection service for profile for a specific user upon launch. The Client stores a copy of that profile locally once the information is received, and then a user plays a different game that uses the same client SDK or serves ads (e.g., optionally avoid ping to the redirection service). The client could then use the cached copy of the profile to trigger the same internal decision tree instead of contacting the redirection service, increasing performance for user.

As an example, a redirection service may record the number of times that it gets called to perform an "ad to click" conversion. The redirection service may gather an accurate number of times that a user's profile was used to show an ad.

Example

Data is retrieved directly from the redirection service or client server and is sent to the client app, and may have the client app/SDK cache the result, then substitute the cached copy for a fresh version of the user's profile. Such an example may operate per app/game, or possibly where information is shared between apps or in an app registry.

Example

1. Client has a list of profiles that they want to query the redirection service for prior to the user's applications requesting information from the client.
2. One batch call may be made providing all profiles identifiers (e.g., IDFA) from the client's servers
3. The redirection service may return the profiles that match the identifiers to the client's server after the request.
   a. These profiles can then be cached on the Client's servers to improve performance when their applications call their servers to request that information.
   b. Alternatively, rules may be created where profiles could be used as a cache, and/or fallback, should they be fresh enough and/or should there be availability/performance issues associated with calling the redirection service at a point in time.

As an example, a "batch" could be most recently updated data (e.g., data updated in the last 24 to 72 hours for example).

Example

1. Client of the redirection service requests a category of profiles
2. Batch call(s) are made for all profiles based on some given information, not individual IDs
   a. E.g., Give profiles that haven't played Game X, have bought over $10 in in-app purchases in the last month, and like Real Time Strategy games.
3. The redirection service returns profiles to the client server based off criteria requested.
   a. These profiles may, as appropriate, then be used to serve up a request that would have otherwise needed to come from the redirection service. This decreases the time required to re-target the user.

b. Alternatively, rules may be created where profiles could be used as a cache, and/or fallback, should they be fresh enough and/or should there be availability/performance issues associated with calling the redirection service at a point in time.

As an example, when planning an ad campaign the redirection service data may be available where such data includes device data for user devices. Such a campaign may target such devices and decide to display specific advertisements to the user based on information provided by the redirection service.

Example (e.g., Continuation of Above Example)

4. Client requests all profile information provided by the redirection service.
5. Batch call(s) are made from the Client to the redirection service for all profiles.
6. The redirection service returns all profiles to the client server.
   a. These profiles can then be used to serve up any request that would have otherwise required querying for a fresh profile from the redirection service.
   b. Alternatively, rules may be created where profiles could be used as a cache, and/or fallback, should they be fresh enough and/or should there be availability/performance issues associated with calling the redirection service at a point in time.

Example Workflows for Getting Data that is not Specific to a Particular User/Device A client may request more generic profile data like by location, by "if someone likes X what else might they like", or other request surrounding groups of users, rather than a single individual. The redirection service would return results to the Client based off of the query they provided by bundling the information with existing profile requests. Alternatively the more generic info may be requested independently.

As an example, on a recurring basis (e.g., daily, weekly, etc.), a redirection service may run analysis of each region (e.g., smallest based off of geo-targeting around an IP) where have at least N profiles (e.g., minimum of 5-10, could be 100s, optionally relatively recent based on time criteria). Such an example may include scripts that group together categories like devices (IPHONE® device vs. IPAD® device, etc.), data based around the time of the day, etc. then determine patterns in click activity, genre preferences, and categorize around other details (e.g. purchase amounts, number of clicks, etc.).

As an example, a redirection service may determine that people from urban Region X, in the morning, spend money on games, and in the afternoon don't spend any money, compared to people in rural Region Y that may only download free applications instead.

As an example, a method can include "machine learning", for example, to determine whether suggestions result in any clicks or any increase in normal conversion (e.g., feedback to determine if possible to look at different combinations of factors, etc.).

As an example, upon receipt of a query for a unique identifier, a redirection service may not necessarily have that profile stored, but still may be able to provide some sort of data/value to client of the redirection service.

As an example, a system can include a processor; memory operatively coupled to the processor; an input; an output; and one or more modules stored in the memory that include instructions executable by the processor to instruct the system to receive information, via the input, that includes information associated with a target; parse the information; build a profile based at least in part on parsed information; build a link based at least in part on the information associated with the target; and transmit the profile via the output.

Figure 13:
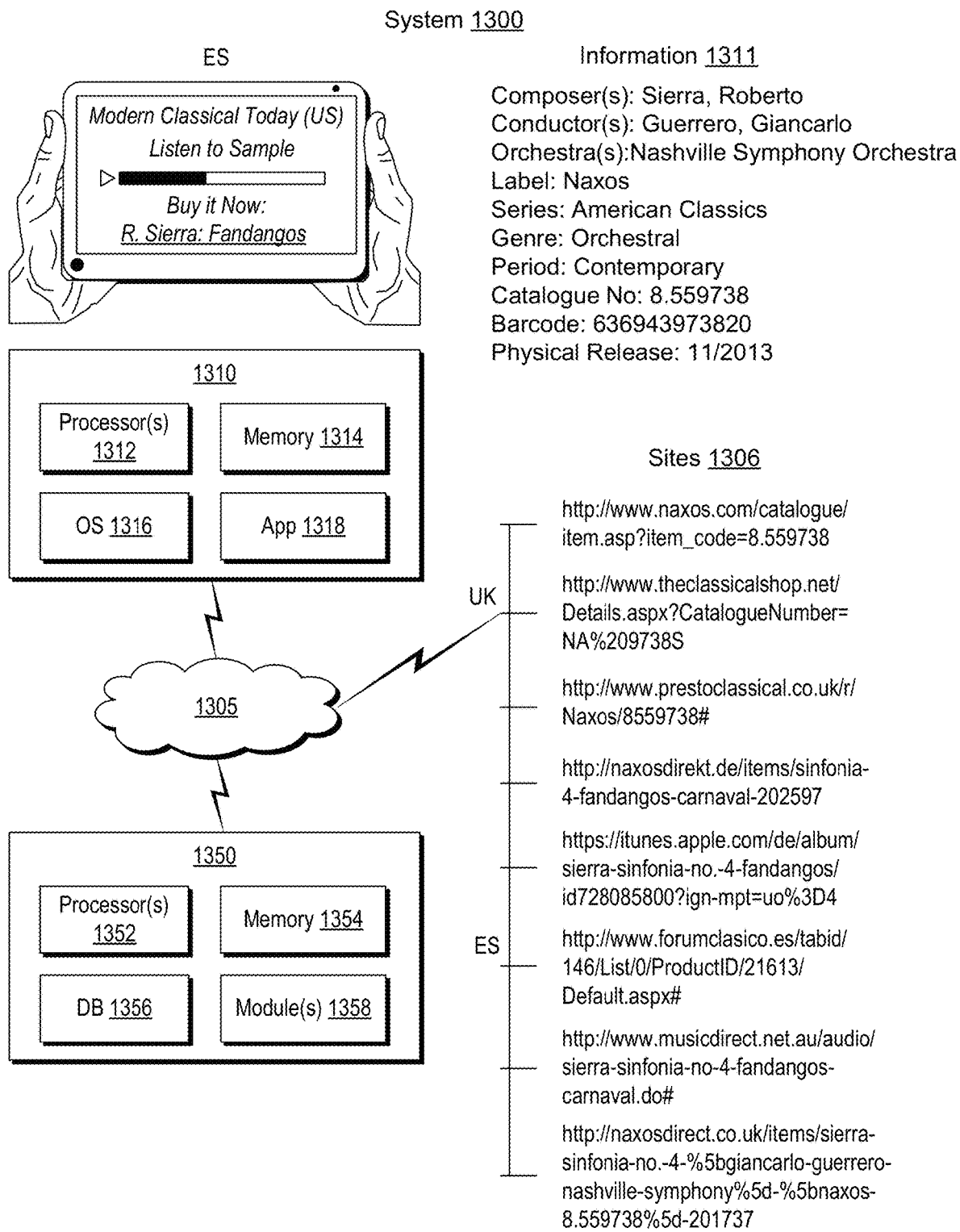
FIG. 13 shows an example of a system.

FIG. 13 shows an example of a system 1300 that can operate at least in part via the Internet 1305. As shown, a device 1310 includes one or more processors 1312, memory 1314, an operating system 1316 and an application 1318 (e.g., a browser application). As shown, the device 1310 may access the Internet 1305, for example, via a network interface of the device 1310. The device 1310 may access information such as the information 1311, which may be available at a website. In the example of FIG. 13, the device 1310 is in a country, such as Spain (ES). As shown, the device 1310 may render information to a display, which may be a touch sensitive display. As shown, a link may be rendered that can be clicked by a user of the device 1310. For example, a link may allow a user to buy media such as audio media.

In the example of FIG. 13, upon actuation of the link, information may be transmitted via the Internet to a computing system 1350, which can include one or more processors 1352, memory 1354, a database 1356 and one or more modules 1358, which can include processor executable instructions (e.g., stored in the memory 1354, etc.) to instruct the computing system 1350 to perform one or more actions.

As an example, the information received by the computing system 1350 may be used to determine which site to redirect the device 1310. For example, a determination may be made via execution of instructions of the computing system 1350. Such a determination may, for example, redirect the request initiated at the device 1310 to a country that may not match the country of the device 1310. For example, where information received and/or accessed via the database 1356 indicates that a country match may not be the best match for the device 1310 and/or a user thereof, the computing system 1350 may redirect the initiated request to a country that is other than Spain. In the example of FIG. 13, eight sites are shown as having the desired media in one or more formats. As shown, a selected site may be in the United Kingdom, rather than in Spain. For example, where the device 1310 has a particular media player, operating system, memory capacity, etc., a format suited to the device 1310 may be selected in a manner that may override a geography criterion.

In the example of FIG. 13, the eight sites include multiple NAXOS® sites, an ITUNES® site and other sites. Thus, various options can exist for a desired item. A redirection service may be aware of such options and facilitate connecting a device to an appropriate one of a plurality of options, for example, to help a user of a particular device (e.g., or devices) gain access to an item that can operate properly on that device (e.g., or devices).

As another example, where geography is primary to another factor or factors, the request initiated by the device 1310 may be directed to Spain (see, e.g., the ES site option). As an example, once at the ES site option, a finer resolution may be available, for example, where digital media is available in a desired and compatible format.

As an example, where bandwidth may be an issue (e.g., consider download charges for mobile devices using a cellular network), the computing system 1350 may redirect to a site that includes a compressed file (e.g., a compressed audio file), for example, rather than a full-fidelity file (e.g., CD quality or above). In such a manner, while the compressed file may be the same price as a full-fidelity file, the user may conserve on mobile data charges to make an overall cost less than that for the full-fidelity file.

As an example, where a device connects to the Internet via a cellular network, information may include mobile subscriber information, mobile carrier information, mobile roaming information, etc. As an example, a redirection service may include data charge information in a database as to one or more data plans, roaming, etc. In such an example, a redirection service may compute a cost or costs for one or more downloadable files, streamable media, etc. As an example, a redirection service may include information about preferences of a user of a device, for example, based on prior downloads, etc. For example, where a user of a mobile device downloads large files indicative of full-fidelity media, the redirection service may select a site and/or an item at a site that meets one or more characteristics of such download history.

As an example, one or more physical factors may exist that can impact a decision to override a geo-location criterion that pertains to device and storefront country matching. As an example, a factor may be a traffic factor (e.g., high Internet traffic, load on servers, etc.), a workflow factor (e.g., holiday(s) in a country, strike, etc.), an order processing factor (e.g., third party downtime, etc.).

As mentioned, time of day may be a factor whether a regular time of day event or period (e.g., morning, lunchtime, etc.) and/or a specific time or period (e.g., beginning of a television show such as "The Voice" or end of the show).

As an example, a redirection service may optionally operate in a manner that load balances (e.g., performs a process that may help to balance load to servers that may be able to access content, process transactions, etc.). For example, a time of day factor may correlate with broadcast of a show (e.g., "The Voice") where demand may be high on the servers to download content. In such an example, a US device may be redirected to a German storefront where a digital download of an item is available and where the servers of the German storefront may be at a lesser load compared to those of a US storefront (e.g., due to time difference, lack of the show in the other destination, etc.).

As an example, a redirection service may consider one or more factor to override a geo-location that matches device and storefront to the same country. As an example, a factor may be to prioritize "download speed" over geo-location (e.g., where "matching" country servers may be slow, etc.).

As an example, a redirection service may direct a device to a particular destination based on an analysis of one or more physical factors, optionally in conjunction with one or more other types of factors. As an example, consider a device and/or a user that prefers to shop at an EBAY® storefront and not at an AMAZON® storefront (e.g., or vice versa). In such a scenario, a redirection service may analyze data and upon receipt of a request direct a device of the user to the relevant item at an EBAY® storefront and prohibit direction to an AMAZON® storefront (e.g., even though the link was originally meant for a pair of shoes at an AMAZON® storefront where those shoes are available at an EBAY® storefront).

A physical reason to override geo-location can be availability of an item. For example, if an item is shown in a foreign storefront but is either not in stock or is an "import" item, or if cannot be found as a related items (e.g., where one or more API searches return no results), a redirection service may decide to not to take the request to a local storefront as there is nothing there for the user of the requesting device to purchase. In such a scenario, the redirection service may direct to a next closest storefront, a storefront known to accept currency of a country of a device/user, etc. For example, where a redirection service decides that an item requested from a device in Germany is not available in amazon.de but is available in amazon.fr and amazon.co.uk, a request may be directed to one of the storefronts where the items is available, optionally based on currency (e.g., Euro versus British Pound) such that amazon.fr becomes the destination and not amazon.co.uk. In such an example, the original item desired may have been associated with an amazon.com (US) storefront, however, as explained above, amazon.fr may be a better destination than amazon.com.

As an example, a goal of a redirection service may be to direct a device to an appropriate item while a goal of the redirection service for its clients or customers may be to build and manage links, for example, to help ensure that the links they include on sites accessible via the Internet work in a relatively reliable manner and, for example, to issue report that their equipment can receive, for example, where a report may indicate when a link has changed. As an example, a redirection service may optionally implement a default process that access stored metadata for a link (e.g., prior to change) to, for example, help determine an appropriate substitute (e.g., or updated) link.

Figure 14:
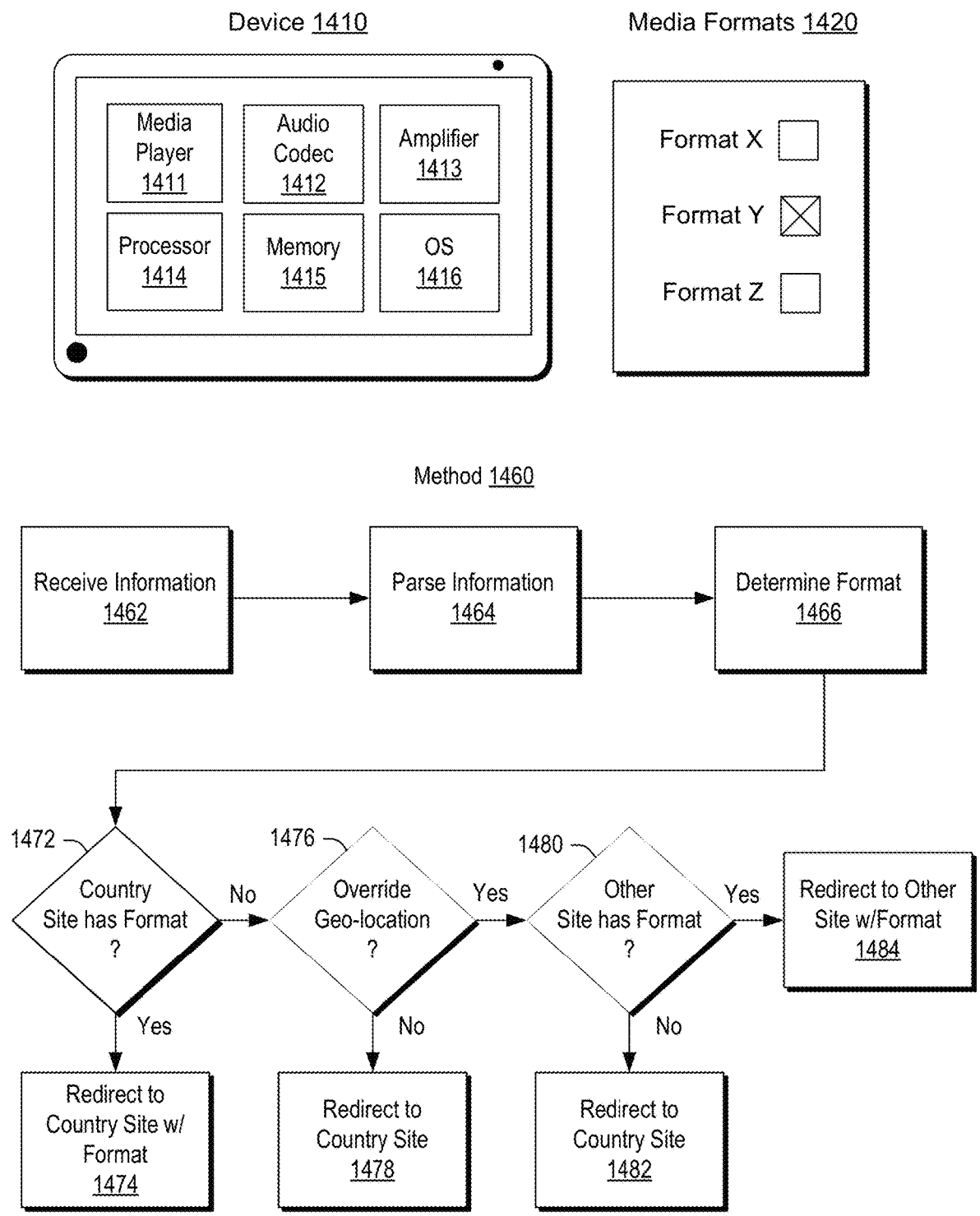
FIG. 14 shows an example of a device, examples of media formats and an example of a method.

FIG. 14 shows an example of a device 1410, example media formats 1420 and an example of a method 1460. As shown, the device 1410 can include a media player 1411, an audio codec 1412, an amplifier 1413, a processor 1414, memory 1415, an OS 1416, etc. As an example, the device 1410 can include cellular network circuitry and/or other network circuitry (e.g., as including one or more network interfaces). As an example, the device 1410 may suitably consume (e.g., play) media of format Y. Or, for example, where the memory 1415 of the device 1410 may be limited (e.g., as known via a device type, mfg. ID, etc.), a format may correspond to a low memory usage format (e.g., low resolution and/or compressed). As an example, for an audio file, consider formats such as, for example, MP3 quality, lossless CD quality, studio quality (e.g., 24/96 standard), etc.

As shown in FIG. 14, the method 1460 includes a reception block 1462 for receiving information, a parse block 1464 for parsing information, a determination block 1466 for determining a format (e.g., or formats), a decision block 1472, a decision block 1476, and a decision block 1480. As shown, the decision block 1472 can include deciding whether a country site has a format, the decision block 1476 can include deciding whether to override a geo-location criterion, and the decision block 1480 can include deciding whether another site has a particular format or formats. In such an example, the method 1460 can include a redirection block 1474 for redirecting to a country site with a particular format or formats, a redirection block 1478 for redirecting to a country site (e.g., which does not include a "best" format), a redirection block 1782 for redirecting to a country site (e.g., which does not include a "best" format) and a redirection block 1484 for redirecting to another site that includes a particular format or formats (e.g., as determined by the determination block 1466).

Figure 15:
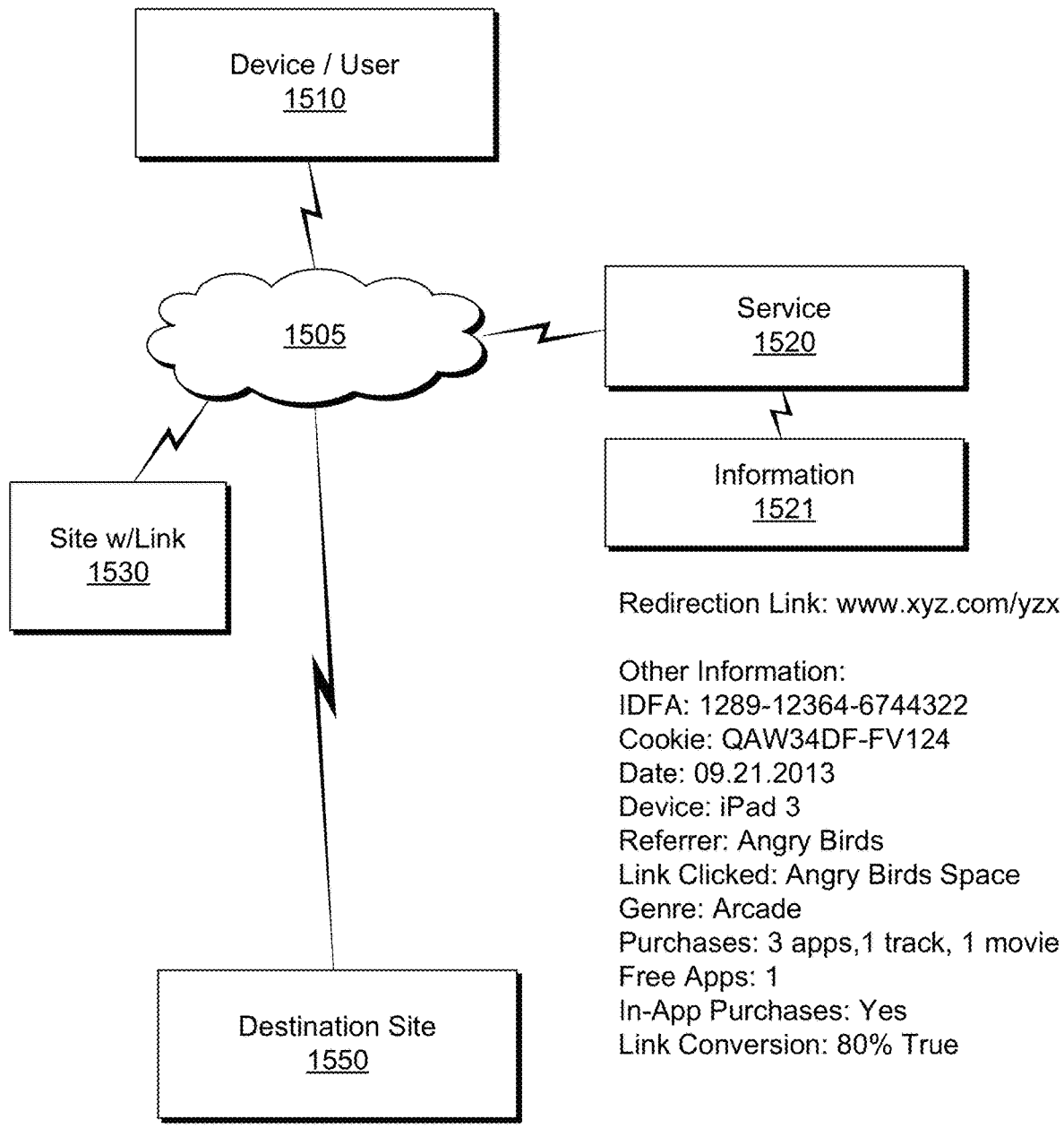
FIG. 15 shows an example of a system.

FIG. 15 shows an example of a system 1500 that includes a device 1510 with an associated user where the device 1510 can be operatively coupled to a network 1505, a service 1520 that is accessible via the network 1505 where the service 1520 can access information 1521 as stored in a data storage, a site 1530 that includes a link or links where the site 1530 is accessible via the network 1505, and a destination site 1550 that is accessible via the network 1505.

As an example, the information 1521 may be maintained by the service 1520, for example, in the data storage of a server. In the example of FIG. 15, the information 1521 can include a redirection link or redirection links and may include other information that may be associated with the device 1510 and/or the user of the device 1510. For example, the information 1521 may include a cookie, a date, a device type, a referrer site, a link clicked, a genre associated with a link clicked, user history and types of items, and statistical information, for example, associated with behavior of the user (e.g., and/or the device 1510).

In the example of FIG. 15, the device 1510 may access the site 1530 and click the link of the site 1530. In turn, the site 1530 may transmit a request to the service 1520 where the service 1520 may access the information and, for example, a redirection link to redirect the device 1510 to the destination site 1550. As an example, a redirection link may be selected by the service 1520, for example, based at least in part on a portion of the other information and/or information that may accompany the request.

As an example, a link may possess information (e.g., intelligence) that comes into play after a click. As an example, information such as the information 1521 may help to determine one or more characteristics of the link in the site 1530. For example, where the information 1521 includes conversion information for different types of items, such information may be used to decide what type of link to place in the site 1530 (e.g., a link in the site 1530 may be an ANGRY BIRDS® game or a classical music track if that user/device had a higher conversion rate for music, rather than apps).

Figure 16:
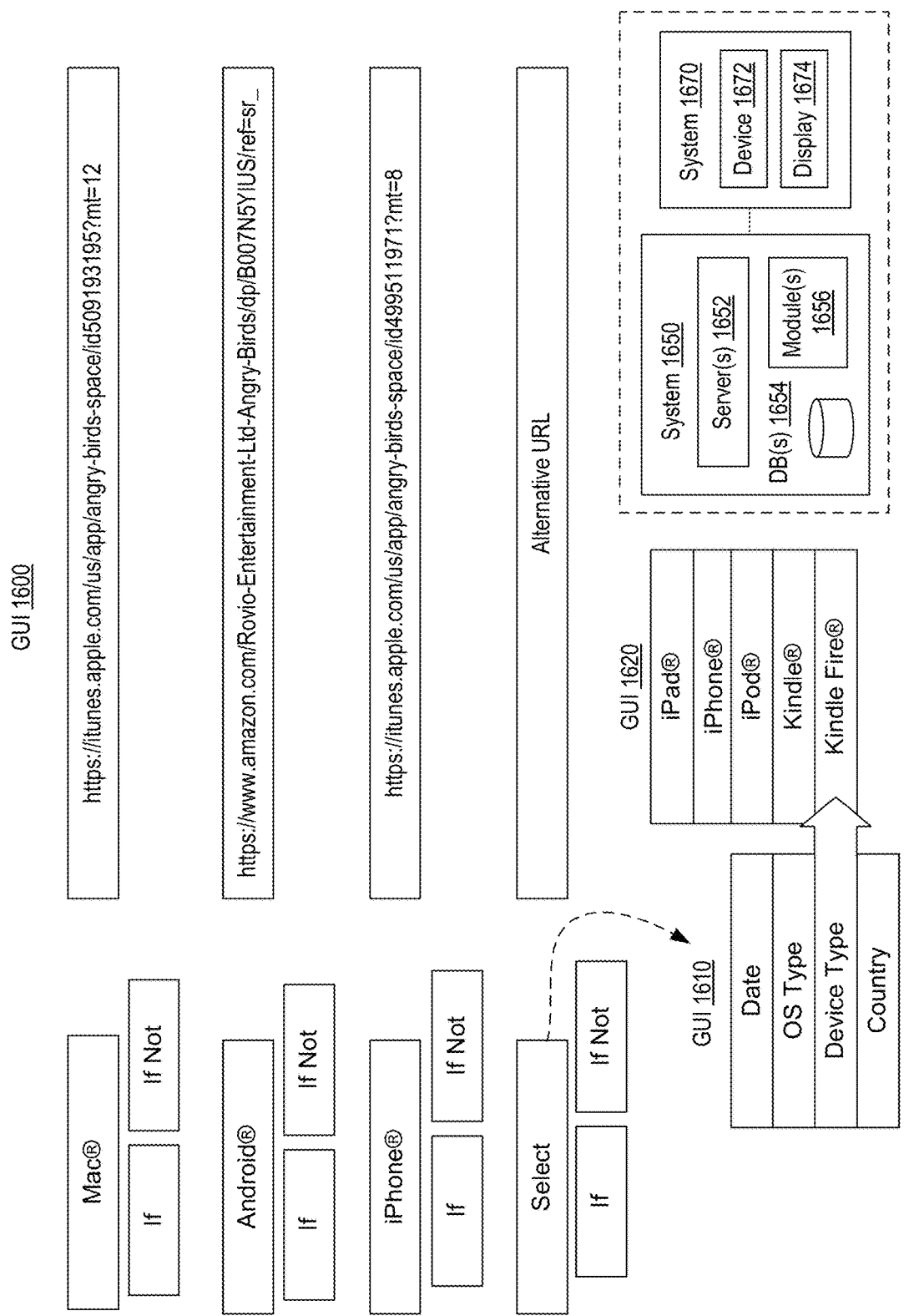
FIG. 16 shows an example of a graphical user interface of a tool and examples of systems.

FIG. 16 shows an example of a graphical user interface (GUI) 1600. As an example, the GUI 1600 may be part of a tool, for example, a tool of a redirection service. As shown in the example of FIG. 16, the GUI 1600 may include various fields and graphical controls that can associate a link with one or more other links. For example, a link may be a master link to a redirection service where upon clicking of the master link as posted on a remote website, the redirection service may receive information where such information is sufficient to select an appropriate redirection link.

As an example, information received by a redirection service may specify a device type and/or, for example, an operating system type. For example, as shown in FIG. 16, links may include a link for a MAC® device type (e.g., optionally an OS X® OS type), a link for an ANDROID® device type (e.g., optionally an ANDROID® OS type), a link for an IPHONE® device (e.g., optionally an IOS® OS type), and a link for one or more other types of devices and/or OSs (e.g., or other properties, types, etc.).

As an example, the GUI 1600 may include a GUI 1610 that includes a menu of options where upon selection of an option another GUI 1620 may be rendered to a display. In such a manner, a client or customer of a redirection service may use a tool with such a GUI to help assure clicks for an item get directed to an appropriate destination site. In such an example, the redirection service may save information and links and redirect links for that client or customer as appropriate.

FIG. 16 also shows an example of a system 1650 that includes one or more servers 1652, one or more databases 1654 and one or more modules 1656. The one or more servers 1652 can include network interfaces and processors as well as memory to store instructions such as instructions in one or more of the one or more modules 1656 (e.g., processor-executable instructions, etc.). Also shown in FIG. 16 is a system 1670 that includes a computing device 1672 that can include or be operatively coupled to a display 1674.

As an example, the system 1650 may receive an instruction from the system 1670 (e.g., via the Internet, etc.) and responsive to the instruction render a GUI such as the GUI 1600 to the display 1674 (e.g., optionally via communication of commands and information from the system 1600 to the system 1670). In such an example, the GUI may include a field that displays a master link, for example, to be associated with one or more additional links that can be entered via a GUI such as the GUI 1600. Such a process may operate, for example, in a SaaS manner. As an example, the system 1670 may include a browser application that is executable to access the system 1650, cause the system 1650 to instantiate a tool (e.g., a tool session) and cause the system 1650 to transmit commands and information to the system 1670 such that the browser application can, at least in part, cause a GUI to be rendered to the display 1674.

As an example, upon entry (e.g., or selection) of one or more links for fields in a GUI (e.g., as rendered to the display 1674), those one or more links may be stored in one or more of the one or more databases of the system 1650 (e.g., the information as to the one or more links can be transmitted from the system 1670 to the system 1650).

As an example, the one or more links may be stored according to one or more data structures (e.g., by the system 1650) where upon receipt of a master link request by the system 1650 (e.g., or another system), one or more instructional modules may be executed by one or more processors (e.g., of a server or servers) such that decision logic can decide which link is to be selected for redirection. For example, a master link may be rendered to a display of a device (e.g., as part of a webpage, an app, etc.) where clicking (e.g., activating) the master link causes transmission of a request from the device to a server that may include circuitry, etc. to implement a redirection service (e.g., consider a redirection service server). In turn, the server that implements the redirection service can redirect the device to an appropriate destination (e.g., via selection of an appropriate link, construction of an appropriate link, etc.).

As an example, various factors may be considered to redirect (e.g., to an appropriate destination accessible via the Internet). For example, geography, item characteristic(s), device characteristic(s), time, network load, user information for a user of a device, etc. Where an item is a digitally downloadable item that is to be consumed (e.g., rendered, executed, etc.) by a particular device (e.g., a device that initiated a transmission to a redirection service server), an appropriate destination may be determined (e.g., via decision making logic and received information) to help ensure that the digital downloadable item is suitable for that particular device.

As an example, the one or more modules 1656 can include instructions that implement decision making logic based at least in part on received information stemming from a remote click of a master link, which can cause a request to be transmitted via the Internet where the request is accompanied by additional information, at least a portion of which may be used in logical decision making. As an example, decision making may be based at least in part on logic established at least in part via entry of information, for example, via a GUI such as the GUI 1600. As shown, the GUI 1600 can include "If" and "If Not" graphical controls, which may be selectable to generate decision making logic (e.g., via one or more rules). As an example, a hierarchy of rules may be established by a tool such as a tool that can call for rendering of a GUI such as the GUI 1600.

As an example, a GUI may include hints that can help guide user input. For example, consider a hint that suggests one or more other types of devices, one or more other types of operating systems, etc. For example, a tool may include a database of items and associated forms, formats, etc. In such an example, the tool may suggest that additional links be added, for example, such that a larger group of devices may be serviced. As an example, consider the GUIs 1610 and 1620 which may be implemented to, for example, enlarge a device base, etc. in a manner where links may be associated with a master link.

As an example, a tool may build logic during use where such logic may be stored and implemented, for example, upon receipt of a request to select an appropriate link.

As an example, a redirection service may include a tool that can associate links with a master link where the master link directs to the redirection service and where the associated links direct to various destination sites, for example, for a particular item. In such an example, when the master link is clicked, a request may be sent to a redirection service where the request includes information about a device, a user, etc. where the redirection service may use at least a portion of such information to select an appropriate one of the links associated with the master link. As an example, a tool may be implemented via circuitry. As an example, circuitry can be hardware and software where software instructions instruct hardware to perform various actions. As an example, circuitry may issue instructions for rendering one or more GUIs to a display, which may be a remote display. As an example, a tool may be implemented in a SaaS manner (e.g., software as a service) where the tool executes at least in part via a local computing device (e.g., a server). In such an example, the tool may be utilized by receipt of commands, instructions, information, etc. received from a remote computing device (e.g., of a client or customer of a redirection service, an intermediary, etc.).

As an example, a redirection service may provide for "stacking" of rules. For example, consider stacking rules (e.g., logical application of rules) as to one or more combinations of country, device, operating system, and time (e.g., or one or more other factors). In such an example, an ANDROID® device from the US could get one link today and a different one tomorrow (e.g., based on OS, country, and time) and, for example, another ANDROID® device in Australia could have a completely different link today and yet a fourth example tomorrow (e.g., based off of country, OS, and time). Various other types of factors may allow for particular decision making, for example, consider type of connection (e.g., WiFi, cellular, hardwire, etc.), which may vary from time-to-time, etc.

FIG. 17 shows the links of FIG. 16 in association with information as to corresponding items. The uppermost link is for a digital item (e.g., an app) that is compatible with OS X® OS version 10.6 or later. The middle link is for a digital item (e.g., an app) that is compatible with a minimum operating system ANDROID® OS version 2.3. The lowermost link is for a digital item (e.g., an app) that is compatible with IOS® OS version 4.3 or later. As an example, such links, compatibilities, etc. may change over time. As an example, a tool may automatically update a link and/or information responsive to such a change. In such an example, a client or customer of a redirection service may have some assurances that links entered via a tool may be updated as appropriate. As an example, a redirection service may notify a client or customer via an electronic notification when an update has occurred (e.g., via a text message, an email, etc.). As an example, updates may be stored as account information for a client or customer account, which may be accessible via a tool, etc.

In the examples of FIG. 17, the file size is also shown, which may be information that can be used in decision making by a redirection service. As indicated for the middle link, an approximate download time is also specified for the 43.5 MB file. In the example of FIG. 17, other information is also listed for the links, which may, for example, be utilized in decision making.

As an example, a dynamic process may occur upon receipt of a request in response to clicking of a master link (e.g., in a website, a game, etc.). For example, a redirection service may include one or more databases of information that can be utilized to expedite searching for one or more appropriate links such as the links illustrated in the example of FIG. 16 as to the different types of operating systems. As an example, a process may include caching information and calculating hashes as well as checking for matching of one or more hashes. As an example, a dynamic process may be implemented with minimal latency such that a user that uses a device to click on a link is directed to an appropriate destination without a detriment to overall user experience (e.g., to not negatively impact a decision to initiate a transaction for an item).

FIG. 18 shows an example of a system 1800, an example of a method 1850 and an example of a method 1870. As shown, the system 1800 includes a device 1810 and a device 1830 operatively coupled to a network 1805 such as the Internet. As an example, the device 1830 may be operatively coupled to a data store 1835, for example, to maintain one or more databases. In the system 1800, the device 1810 may be a client or customer device of a client or a customer of a redirection service and, for example, the device 1830 may be a device of a redirection service.

As shown in FIG. 18, the method 1830 includes a login block 1852 for logging into a redirection service device, an access block 1854 for accessing a tool of the redirection service device, an entry block 1856 for entering link information via the tool, and a save block 1858 for saving link information in association with a master link. For example, the device 1810 of the system 1800 may login to the device 1830 to access a tool for entering link information and transmit a save command to save the link information. Such link information may be associated with a master link for use by a client or customer of the redirection service that may provide access to the device 1830 (e.g., via client or customer accounts).

As shown in FIG. 18, the method 1870 includes a post block 1872 for posting a master link, a reception block 1874 for receiving a click on the posted master link, a transmit block 1876 for transmitting information to a redirection service and a redirect block 1878 for redirecting a "clicker" to an appropriate link. As an example, an appropriate link may be decided by a redirection service device based on information associated with the clicker (e.g., a device and/or a user). As an example, an appropriate link may be a geographically relevant link or may be a link selected on a basis other than geography. As an example, a redirection service may build a master link and receive information when the master link has been activated. In turn, the redirection service may select a redirection link based at least in part on at least a portion of the received information.

As an example, a decay process may be implemented in combination with one or more other processes. As an example, a decay process may include levels such as Exact Match (e.g., try the same unique identifier in the destination storefront); Perfect Match (e.g., consider it a match when the most important metadata matches exactly); Best Match (e.g., clean up the metadata and consider it a match when a certain degree of precision exists); Decay (e.g., for products that have multiple media (e.g., Streaming, DVD, VHS, etc. or, for example, when there is a logical child-parent relationship such as song→album→artist); Search (e.g., not finding the specific item but using metadata to construct a search and letting the host service bear burden); and Return (e.g., return to an original item).

As an example, a profile may include languages understood by a device and/or user. For example, a device may include or access a translation service and/or be used by a user with some level of understanding of a foreign language or languages (e.g., as may be evidenced by search history, content downloaded, etc.). As an example, where a device has a history of downloading songs, videos, etc. in French, a redirection service may consider such information when deciding where to direct a request originated by that device (e.g., French is OK for device XYZ).

As an example, for a digital product, a need may not exist to go away from an exact match if a redirection service finds that a unique identifier exists in a destination store. However, with physical products, reasons can exist to perform a decay process. For example, the item is an "import". This can mean that even though the retail/details page exists in the destination storefront the item is still being sold from the source storefront so it may be in a foreign currency, in a foreign language, and require a significant time or cost to be shipped/delivered. Also, in music industry, import items may lack particular royalty streams (e.g., royalties, etc. go to one or more entities in a foreign country, etc.). As another example, the item is not in stock. In such an example, even though the item is found in the destination storefront, if it is not currently in stock, or will never be in stock, then such a destination can result in a bad user experience, as the item may have been available for sale in the source storefront (e.g., even though a user may have to deal with foreign currency/language and shipping).

As an example, for a Perfect Match level, metadata like artist name, album name and track name may be matched. As an example, a process may test first on one or more other identifiers, such as UPC, manufacturer part number, model part number, catalog number, EAN (European article number) from the source country against the destination country to see if any matches exist. If not, then the redirection service may try using metadata like artist, album, and track name.

As an example, for a Best Match level, one or more other identifiers may be used such as trying to match UPC against one or more other unique identifier values. Such an approach can help overcome disarray of how information is entered and arranged in a database (e.g., AMAZON® database) and, where an item may have the UPC and MPN available, that same item may not have those values added but the same value may be listed in a database as the catalog number and/or as the EAN.

As an example, a process can utilize a flag that can be added to a URL that keeps a result from going to a search level (see, e.g., aforementioned Search level). In such an example, the redirection service can bypass a search level and proceed to direct a request to the original item (e.g., where the link may be affiliated properly). Such a flag can be added per link and/or per "group" of links, or to an account, etc. As an example, logic may exist within a redirection service that may act, as appropriate, to avoid a search level (e.g., where no results occur in one or more prior levels). For example, if there is nothing related at all in one or more levels, then a redirection service may avoid directing a requesting device to a blank search results page. In such instances, direction to an original site via a redirection link with other information added (e.g., affiliation, etc.) may be appropriate as a "best" approach. As an example, where items are returned via upper levels, then a search level is likely to return results and a device may be directed to a search results page.

As an example, a process may access one or more dictionaries, for example, to translate labels, categories, etc. For example, in a US storefront a phrase may be "Digital Music Album" whereas in a German storefront, the corresponding phrase for items may be "MP3-Alben". Such an approach may also handle labels like "Import" (eg. "PEGI", "Importación", "輸入版", etc.). As an example, a redirection service may implement one or more dictionaries, for example, as part of a decay/matching process for an item or items. Such an approach may facilitate determination as to potential matches as well as non-matches (e.g., which may be excluded).

As an example, a redirection service can include mapping logic with information therein that can match categories. For example, consider a scenario where the category "Garden" exists in both the ES and IT storefronts; the "HomeGarden" category exists in DE, UK and US; the "Home" category exists in CN and ES; and the "Home & Kitchen" category exists in ES and IN. In such an example, mapping technology can help decay, searching, etc. (e.g., and help to minimize false positives). As an example, a redirection service may process category based links and implement logic that can help to ensure that searches are category specific. For example, a generic item, say "Star Wars Figure" could be narrowed down to toys, clothes, movies, collectibles, etc.

As an example, a redirection service may include a whitelist of supported links (see, e.g., previously mentioned domains, etc.). In such an example, a redirection service can include an ability to pass various types of links and decide to "transform" the types of links where benefits stem from such transformation (e.g., affiliate links, etc.). As an example, a redirection service may track/provide metrics on traffic from various types of links. As an example, links of specific types inside of ecosystems supported may be handled in a manner that they are not to be altered. For example, associates.amazon.com is a type of an AMAZON® domain that cannot hold/carry an affiliate parameter.

As an example, a redirection service can include an alert queue that can build client based reports to alert them as to their links that are not working so that they can be fixed (e.g., by a redirection service tool used by the client or by the redirection service).

As an example, a redirection service can implement a designed language to build rule sets. For example, consider a language that includes words such as "comparison" and "composition" with associated blocks of code that include inputs like Type, Operation, Input, Parameter, Syntax, Order, OnFail, and OnSuccess. In such an example, the JSON format may be used to organize such blocks.

As an example, a redirection service can include a tool that allows for testing and reviewing matching language for specific links. For example, such a tool can receive a link and present a GUI for purposes of what caching server to use, if one is to be used, and to run the match. In such an example, a result may be output along with, for example, logging from working through the results. In such an example, a redirection service may trace through this logging to assess possible improvements to one or more algorithms.

As an example, a redirection service can include a rule testing tool. For example, such a tool may be implemented when a change to a rule set is made. Based on results, it is possible to determine if one or more changes to the rule set had positive and/or negative impact on matching and, for example, what levels of a matching process (e.g., a decay process) were impacted. As an example, such a tool may be implemented in a JSON based language.

Figure 19:
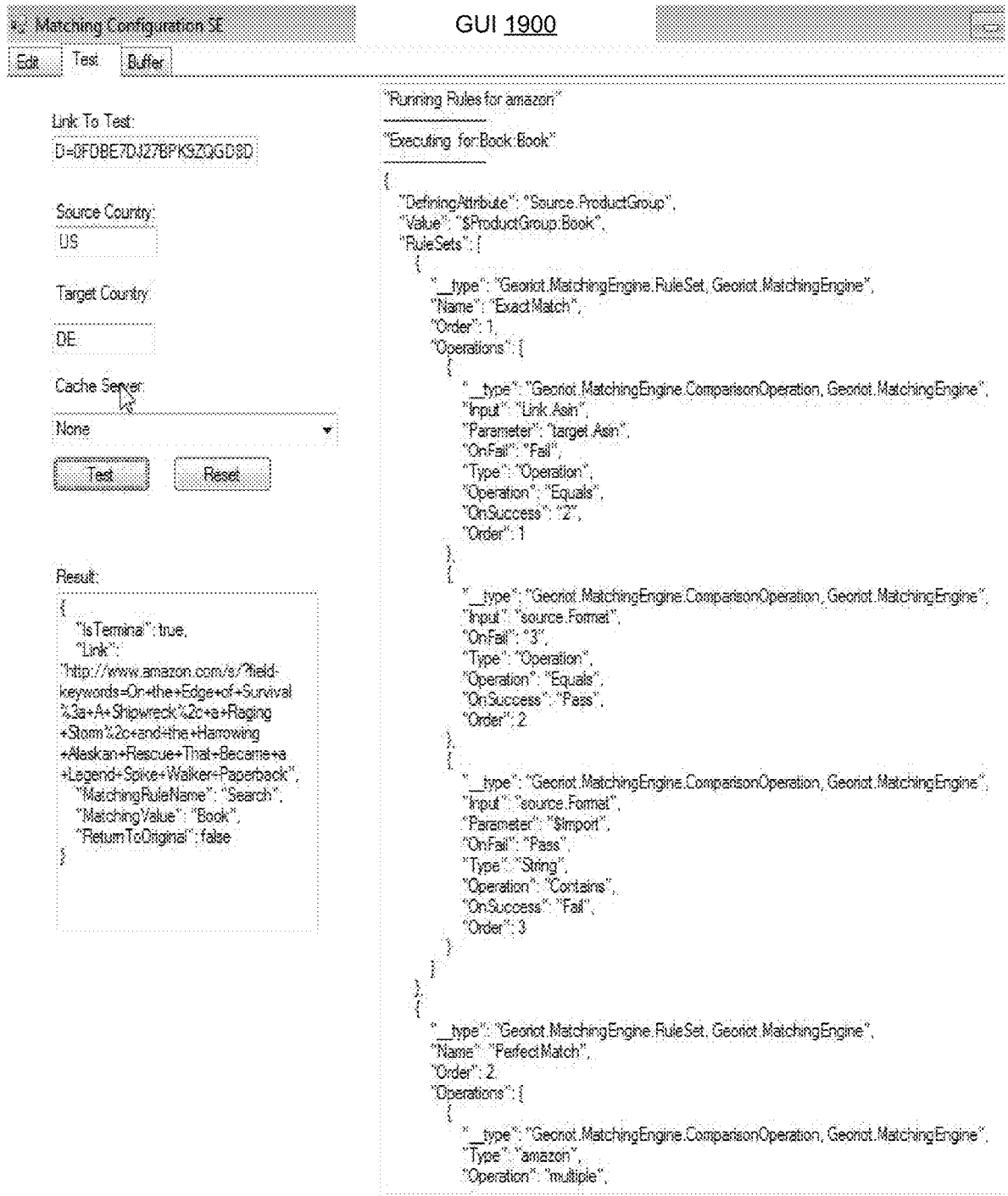
FIG. 19 shows an example of a graphical user interface of an example of a link testing tool.

FIG. 19 shows an example of a GUI 1900 of an example of a rule testing tool as implemented using, for example, a JSON based language (see, e.g., right side of FIG. 19). As shown in the example GUI 1900 of FIG. 19, a field exists for a link to test, a field exists for a source country, a field exists for a target country, a cache server option exists for selection of a cache server, a result field exists and a rule pane may exist for illustrating rules that can be implemented to test a link. As an example, a redirection service may include instructions executable to run such a tool. For example, consider the one or more modules 1656 of the system 1650 of FIG. 16 as optionally including instructions that can call for rendering of a GUI such as the GUI 1900 of FIG. 19 and for processing inputs to generate a result such as a link test result.

FIG. 20 shows an example of JSON based language for building matching rule sets. As shown in FIG. 20, examples are presented for ExactMatch, PerfectMatch and BestMatch (e.g., as may be implemented as part of a matching process).

As an example, a system can include a processor; memory operatively coupled to the processor; an input; an output; and one or more modules stored in the memory that include instructions executable by the processor to instruct the system to receive information, via the input, that includes information associated with a target; parse the information; access a profile; and build a link based at least in part on the information and at least in part on the profile. In such an example, a profile may be or include a device profile. As an example, a device profile can include a device type. As an example, a device profile can include an operating system type. As an example, a device profile can include a device type, an operating system type (e.g., and/or version), and optionally other parameters.

As an example, a target may be a webpage associated with a downloadable digital file. In such an example, the downloadable digital file may be compatible with an operating system type (e.g., or types, versions, etc.). As an example, a system may build a link that is based at least in part on information and at least in part on a profile where the built link is a link to a webpage associated with a downloadable digital file that is compatible with an operating system type.

As an example, a system can include a processor; memory operatively coupled to the processor; an input; an output; and one or more modules stored in the memory that include instructions executable by the processor to instruct the system to receive a link, via the input, that includes information associated with content available in a plurality of different forms; associate the link with other links where the other links correspond to the plurality of different forms of the content; and output, via the output, the associated other links to a database. In such an example, the plurality of different forms can include forms for different types of operating systems (e.g., optionally including version types). As an example, a plurality of different forms can include digital data formats (e.g., compression, codec, medium, streaming, etc.).

As an example, a system can include a processor; memory operatively coupled to the processor; an input; an output; and one or more modules stored in the memory that include instructions executable by the processor to instruct the system to receive information, via the input, that includes information associated with a target; parse the information; build a profile based at least in part on parsed information; build a link based at least in part on the information associated with the target; and transmit the profile via the output. In such an example, the received information can include information associated with a device or an operating system of a device. As an example, a profile can include a profile for a user associated with the received information.

As an example, a profile may include information germane to online commerce. As an example, a system can include one or more modules configured to associate received information with an affiliate. As an example, a target may be an item available in an on-line store (e.g., where a link or links may be for a webpage or webpages of an on-line store or on-line stores where the item may be available for purchase, lease, licensing, downloading, etc.). As an example, a target may be or include digital media. As an example, received information can include an advertising identifier (e.g., an IDFA or other advertising identifier).

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A method comprising: accessing database data that comprise visitation data and conversion data for items at a plurality of different Internet stores; using the database data, determining factors of a redirection services algorithm that increase conversion rate for each of the items; receiving a URL via an interface of a computing system responsive to activation of an Internet link by a remote user device, wherein the URL comprises information associated with one of the items; parsing the URL for a plurality of factors; and using the redirection services algorithm and one or more of the plurality of factors of the URL, generating, responsive to the activation of the Internet link by the remote user device, a redirection URL for the one of the items, wherein the redirection URL automatically redirects the remote user device to a webpage that comprises at least one of the plurality of different Internet stores for the one of the items.

2. The method of claim 1, wherein generating the redirection URL comprises generating the redirection URL for the one of the items for a particular affiliate program.

3. The method of claim 2, wherein the particular affiliate program comprises a selected one of a plurality of different affiliate programs.

4. The method of claim 1, wherein the factors of the redirection services algorithm that increase the conversion rate for each of the items correspond to a particular affiliate program.

5. The method of claim 1, wherein the factors of the redirection services algorithm that increase the conversion rate for each of the items correspond to a plurality of different particular affiliate programs.

6. The method of claim 5, wherein the plurality of different particular affiliate programs correspond to a plurality of commissions, wherein at least some of the plurality of commissions differ.

7. The method of claim 1, wherein generating the redirection URL comprises generating the redirection URL for increasing the conversion rate for the one of the items for a particular affiliate program wherein the particular affiliate program comprises a corresponding commission for a sale of the one of the items.

8. The method of claim 1, wherein the webpage comprises at least two of the plurality of different Internet stores for the one of the items.

9. The method of claim 1, wherein the database data comprise conversion data that associate the at least one of the plurality of different Internet stores and the remote user device.

10. The method of claim 1, wherein the database data comprise visitation data that associate another one of the plurality of different Internet stores and the remote user device.

11. The method of claim 10, wherein the webpage does not comprise the another one of the plurality of different Internet stores.

12. The method of claim 1, wherein parsing the URL for the plurality of factors comprises parsing for a domain name.

13. The method of claim 12, wherein the domain name comprises a country code.

14. The method of claim 13, wherein generating the redirection URL comprises using the country code and wherein the webpage that comprises the at least one of the plurality of different Internet stores for the one of the items comprises at least one Internet store having a domain name with the country code.

15. The method of claim 1, wherein parsing the URL for the plurality of factors comprises parsing for a unique identifier for the one of the items.

16. A system comprising: a processor; memory operatively coupled to the processor; and instructions stored in the memory that are executable by the processor to instruct the system to access database data that comprise visitation data and conversion data for items at a plurality of different Internet stores; use the database data to determine factors of a redirection services algorithm that increase conversion rate for each of the items; receive a URL responsive to activation of an Internet link by a remote user device, wherein the URL comprises information associated with one of the items; parse the URL for a plurality of factors; and use the redirection services algorithm and one or more of the plurality of factors of the URL to generate, responsive to the activation of the Internet link by the remote user device, a redirection URL for the one of the items, wherein the redirection URL automatically redirects the remote user device to a webpage that comprises at least one of the plurality of different Internet stores for the one of the items.

17. A method comprising: accessing database data that comprise visitation data and conversion data for items at a plurality of different Internet stores; using the database data, determining factors of a redirection services algorithm that increase conversion rate for each of the items; receiving a URL via an interface of a computing system responsive to activation of an Internet link by a remote user device, wherein the URL comprises information associated with one of the items; parsing the URL for a plurality of factors; wherein parsing the URL for the plurality of factors comprises parsing for a product description for the one of the items, wherein the product description comprises at least one search term, and wherein the received URL is generated responsive to initiation of a search by the remote user device using the at least one search term; and using the redirection services algorithm and one or more of the plurality of factors of the URL, generating, responsive to the activation of the Internet link by the remote user device, a redirection URL for the one of the items, wherein the redirection URL automatically redirects the remote user device to a webpage that comprises at least one of the plurality of different Internet stores for the one of the items.

18. The method of claim 17, wherein the one or more of the plurality of factors of the URL comprises at least one of the at least one search term.

* * * * *